(12) United States Patent
Isono

(10) Patent No.: US 12,498,001 B2
(45) Date of Patent: Dec. 16, 2025

(54) ENGAGEMENT DEVICE

(71) Applicant: AISIN CORPORATION, Aichi (JP)

(72) Inventor: Hiroshi Isono, Kariya (JP)

(73) Assignee: AISIN CORPORATION, Kariya (JP)

( * ) Notice: Subject to any disclaimer, the term of this patent is extended or adjusted under 35 U.S.C. 154(b) by 13 days.

(21) Appl. No.: 18/698,800

(22) PCT Filed: Nov. 16, 2022

(86) PCT No.: PCT/JP2022/042575
§ 371 (c)(1),
(2) Date: Apr. 5, 2024

(87) PCT Pub. No.: WO2023/090364

PCT Pub. Date: May 25, 2023

(65) Prior Publication Data

US 2025/0237273 A1    Jul. 24, 2025

(30) Foreign Application Priority Data

Nov. 19, 2021  (JP) .................. 2021-188939
Nov. 19, 2021  (JP) .................. 2021-188940
Dec. 24, 2021  (JP) .................. 2021-211353

(51) Int. Cl.
*F16D 13/52* (2006.01)
*F16D 65/18* (2006.01)
(Continued)

(52) U.S. Cl.
CPC .............. *F16D 13/52* (2013.01); *F16D 65/18* (2013.01); *F16D 67/02* (2013.01); *F16D 2121/24* (2013.01); *F16D 2125/50* (2013.01)

(58) Field of Classification Search
CPC .......... F16D 13/52; F16D 65/18; F16D 67/02; F16D 2121/24; F16D 2125/50
See application file for complete search history.

(56) References Cited

U.S. PATENT DOCUMENTS 2,418,019 A * 3/1947 Fast ................ F16D 67/02
                                                192/93 C
2,440,304 A * 4/1948 Simmons ........... F16D 67/02
                                                188/82.8

(Continued)

FOREIGN PATENT DOCUMENTS

EP      0 194 120 A2    9/1986
JP      S57-200398 U   12/1982

(Continued)

OTHER PUBLICATIONS

Oct. 24, 2024 extended Search Report issued in European Patent Application No. 22895645.4.

(Continued)

*Primary Examiner* — Farhana Pervin
(74) *Attorney, Agent, or Firm* — Oliff PLC

(57) ABSTRACT

A clutch mechanism includes a first frictional engagement element that rotates integrally with a first rotary member, and a second frictional engagement element that rotates integrally with a second rotary member. A brake mechanism includes a third frictional engagement element that rotates integrally with a target rotary member that is one of the rotary members, and a fourth frictional engagement element fixed to a non-rotary member. A pressing mechanism includes a pressing part disposed between, in an axial direction, the frictional engagement elements and the frictional engagement elements, a driven part coupled to the pressing part so as to interlock therewith, and a linear motion mechanism that moves the driven part in the axial direction. The clutch mechanism and the brake mechanism are selectively engaged in accordance with whether the driven part is moved to an axial first side or to an axial second side by the linear motion mechanism.

10 Claims, 12 Drawing Sheets

(51) Int. Cl.
*F16D 67/02* (2006.01)
*F16D 121/24* (2012.01)
*F16D 125/50* (2012.01)

(56) References Cited

U.S. PATENT DOCUMENTS

| | | | | |
|---|---|---|---|---|
| 3,088,552 A | * | 5/1963 | Breting | F16D 67/02 |
| | | | | 188/106 F |
| 3,202,249 A | * | 8/1965 | Schubert | F16D 67/02 |
| | | | | 192/85.48 |
| 3,235,045 A | | 2/1966 | Pop | |
| 3,278,774 A | | 10/1966 | Roller et al. | |
| 2018/0306258 A1 | * | 10/2018 | Okumura | F16D 13/683 |
| 2022/0154781 A1 | * | 5/2022 | Iwasaki | F16D 25/0638 |

FOREIGN PATENT DOCUMENTS

| | | |
|---|---|---|
| JP | 2012-197846 A | 10/2012 |
| JP | 2016-121722 A | 7/2016 |

OTHER PUBLICATIONS

Feb. 7, 2023 International Search Report issued in International Patent Application No. PCT/JP2022/042575.

* cited by examiner

ENGAGEMENT DEVICE

TECHNICAL FIELD

The present disclosure relates to an engagement device including a clutch mechanism and a brake mechanism.

BACKGROUND ART

An example of such an engagement device is disclosed in the following Patent Literature 1. Hereinafter, reference signs in Patent Literature 1 are cited in parentheses in the description of BACKGROUND ART.

An engagement device (3) disclosed in Patent Literature 1 includes a clutch mechanism (31) that selectively engages a first rotary member (33) with a second rotary member (34), and a brake mechanism (32) that selectively engages the first rotary member (33) with a non-rotary member (35).

The clutch mechanism (31) includes a first frictional engagement element (31b) coupled to the first rotary member (33) so as to rotate integrally therewith, and a second frictional engagement element (31a) coupled to the second rotary member (34) so as to rotate integrally therewith. The brake mechanism (32) includes a third frictional engagement element (32a) coupled to the first rotary member (33) so as to rotate integrally therewith, and a fourth frictional engagement element (32b) fixed to the non-rotary member (35).

CITATION LIST

Patent Literature

Patent Literature 1: JP 2012-197846 A

SUMMARY OF DISCLOSURE

Technical Problems

The engagement device (3) disclosed in Patent Literature 1 includes a first pressing mechanism (72) that presses the first frictional engagement element (31b) and the second frictional engagement element (31a) of the clutch mechanism (31) in an axial direction (left-right direction in FIG. 2 in Patent Literature 1), and a second pressing mechanism (77) that presses the third frictional engagement element (32a) and the fourth frictional engagement element (32b) of the brake mechanism (32) in the axial direction.

The clutch mechanism (31) and the brake mechanism (32) are arranged side by side in a radial direction (vertical direction in FIG. 2 in Patent Literature 1). In addition, the first pressing mechanism (72) is disposed on one side (right side in FIG. 2 in Patent Literature 1) in the axial direction with respect to the clutch mechanism (31). The second pressing mechanism (77) is disposed on the other side (right side in FIG. 2 in Patent Literature 1) in the axial direction with respect to the brake mechanism (32). Such a configuration causes an increase in the size of the engagement device (3).

Therefore, it is desired to realize an engagement device that can be downsized in a configuration including a clutch mechanism and a brake mechanism.

Solutions to Problems

In view of the above, a characteristic configuration of an engagement device is that:

the engagement device includes a clutch mechanism that selectively engages a first rotary member with a second rotary member, and a brake mechanism that selectively engages a target rotary member that is one of the first rotary member and the second rotary member with a non-rotary member;

the engagement device includes a pressing mechanism that changes states of engagement of the clutch mechanism and the brake mechanism; and when a direction along an axis of rotation of the first rotary member is defined as an axial direction, one side in the axial direction is defined as an axial first side, and the other side in the axial direction is defined as an axial second side, the clutch mechanism includes a first frictional engagement element coupled to the first rotary member so as to rotate integrally with the first frictional engagement element, and a second frictional engagement element coupled to the second rotary member so as to rotate integrally with the second rotary member, the first frictional engagement element and the second frictional engagement element are disposed to face each other in the axial direction, and are frictionally engaged with each other by being pressed in the axial direction, the brake mechanism includes a third frictional engagement element coupled to the target rotary member so as to rotate integrally with the target rotary member, and a fourth frictional engagement element fixed to the non-rotary member, the third frictional engagement element and the fourth frictional engagement element are disposed to face each other in the axial direction at positions spaced apart, to the axial second side, from the first frictional engagement element and the second frictional engagement element, and are frictionally engaged with each other by being pressed in the axial direction, the pressing mechanism includes a pressing part disposed between, in the axial direction, the first frictional engagement element and the second frictional engagement element, and the third frictional engagement element and the fourth frictional engagement element, a driven part coupled to the pressing part so as to interlock with the pressing part, and a linear motion mechanism that moves the driven part in the axial direction, the first rotary member, the second rotary member, the first frictional engagement element, the second frictional engagement element, the third frictional engagement element, and the fourth frictional engagement element are coaxially disposed, and the clutch mechanism and the brake mechanism are selectively engaged in accordance with whether the driven part is moved to the axial first side or to the axial second side by the linear motion mechanism.

According to this characteristic configuration, the pressing part, that is moved in the axial direction via the driven part by the linear motion mechanism, is disposed between, in the axial direction, the first frictional engagement element and the second frictional engagement element, and the third frictional engagement element and the fourth frictional engagement element that are disposed on the axial second side with respect to the first frictional engagement element and the second frictional engagement element. Then, when the driven part is moved to the axial first side by the linear motion mechanism, the first frictional engagement element and the second frictional engagement element are pressed by the pressing part to bring the clutch mechanism into an engaged state, and the pressing on the third frictional engagement element and the fourth frictional engagement element by the pressing part is released to bring the brake mechanism into a disengaged state. On the other hand, when the driven part is moved to the axial second side by the linear motion mechanism, the third frictional engagement element and the fourth frictional engagement element are pressed by the pressing part to bring the brake mechanism into an engaged state, and the pressing on the first frictional engagement element and the second frictional engagement element by the pressing part is released to bring the clutch mechanism into a disengaged state. As a result, the states of engagement of the clutch mechanism and the brake mechanism can be changed by the common pressing mechanism. Therefore, in the configuration including the clutch mechanism and the brake mechanism, the engagement device can be downsized.

DESCRIPTION OF EMBODIMENTS

1. Engagement Device According to First Embodiment

Figure 1:
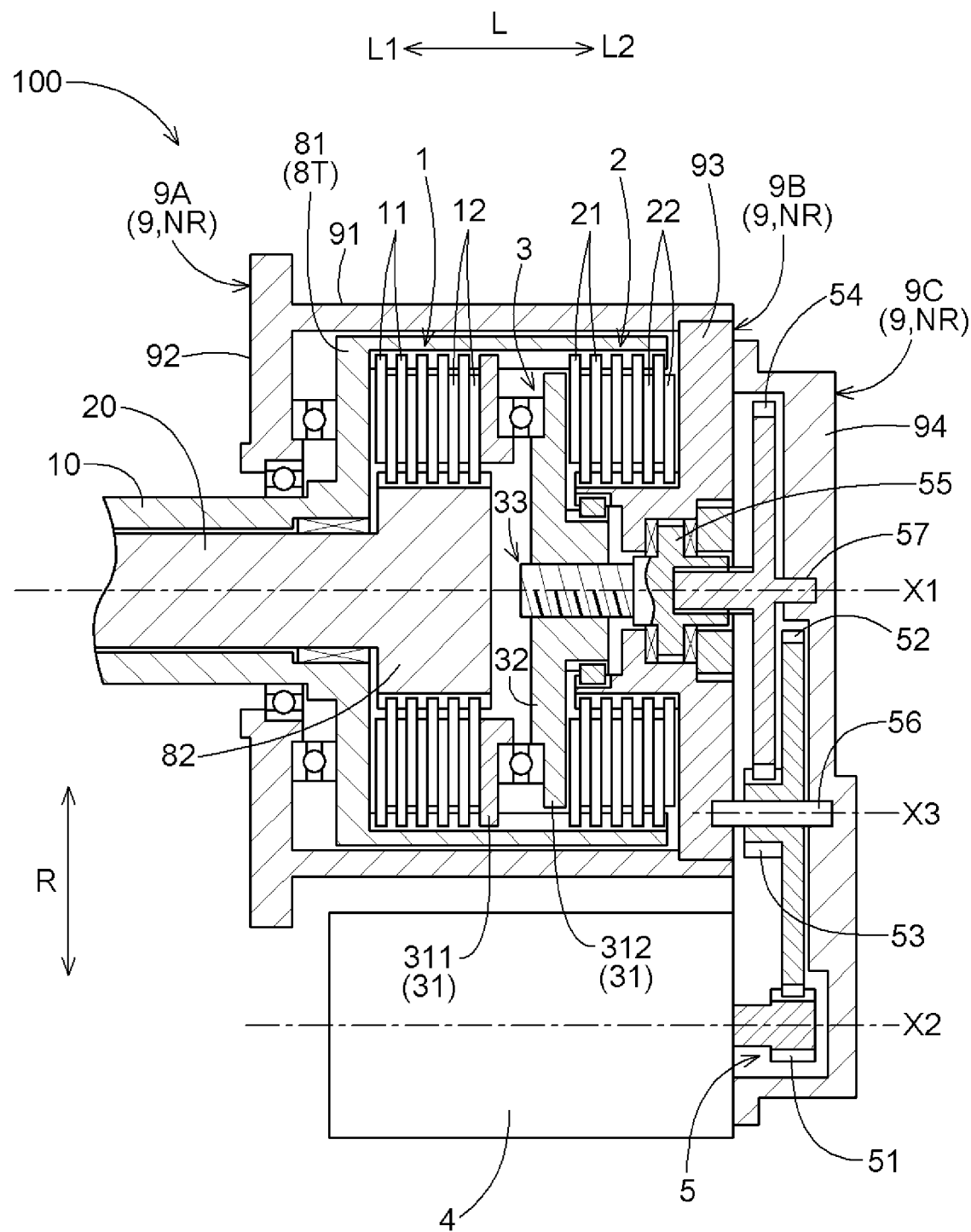
FIG. 1 is a cross-sectional diagram taken along an axial direction of an engagement device according to a first embodiment.

Hereinafter, an engagement device 100 according to a first embodiment will be described with reference to the drawings. As shown in FIG. 1, the engagement device 100 includes a clutch mechanism 1 that selectively engages a first rotary member 81 with a second rotary member 82, a brake mechanism 2 that selectively engages a target rotary member 8T that is one of the first rotary member 81 and the second rotary member 82 with a non-rotary member NR, and a pressing mechanism 3 that changes states of engagement of the clutch mechanism 1 and the brake mechanism 2.

The first rotary member 81 and the second rotary member 82 are supported to be relatively rotatable with each other. In the following description, a direction along the axis of rotation of the first rotary member 81 is defined as an "axial direction L". One side in the axial direction L is defined as an "axial first side L1", and the other side is defined as an "axial second side L2". In addition, a direction orthogonal to the axes of rotation of the rotary members, such as the first rotary member 81, is defined as a "radial direction R" based on each axis of rotation. When it is not necessary to distinguish which axis of rotation is used as a reference or when it is clear which axis of rotation is used as a reference, it may be simply referred to as the "radial direction R".

In the present embodiment, the non-rotary member NR is a case 9 that houses the engagement device 100. In the present embodiment, the case 9 includes a first peripheral wall portion 91, a first side wall portion 92, a support wall portion 93, and a cover portion 94.

The first peripheral wall portion 91 is formed to cover the outer sides, in the radial direction R, of the first rotary member 81 and the second rotary member 82. The first side wall portion 92 is formed to cover the axial first side L1 of each of the first rotary member 81 and the second rotary member 82. The support wall portion 93 is formed to cover the axial second side L2 of each of the first rotary member 81 and the second rotary member 82. The cover portion 94 is formed to cover the axial second side L2 of the support wall portion 93.

In the present embodiment, the first peripheral wall portion 91 is formed in a tubular shape having an axis along the axial direction L. The opening, on the axial first side L1, of the first peripheral wall portion 91 is closed by the first side wall portion 92. The opening, on the axial second side L2, of the first peripheral wall portion 91 is closed by the support wall portion 93. In the present example, the first peripheral wall portion 91 and the first side wall portion 92 are integrally formed to constitute a first case portion 9A. A second case portion 9B including the support wall portion 93 is fitted into the first case portion 9A from the axial first side L1 such that the support wall portion 93 is positioned on the inner side, in the radial direction R, with respect to the first peripheral wall portion 91. A third case portion 9C including the cover portion 94 is joined to the second case portion 9B from the axial first side L1.

The clutch mechanism 1 includes a first frictional engagement element 11 coupled to the first rotary member 81 so as to rotate integrally therewith, and a second frictional engagement element 12 coupled to the second rotary member 82 so as to rotate integrally therewith.

The first frictional engagement element 11 and the second frictional engagement element 12 are disposed to face each other in the axial direction L. The first frictional engagement element 11 and the second frictional engagement element 12 are frictionally engaged with each other by being pressed in the axial direction L. In the present embodiment, a plurality of the first frictional engagement elements 11 and a plurality of the second frictional engagement elements 12 are provided, which are alternately disposed along the axial direction L. Either of the first frictional engagement elements 11 and the second frictional engagement elements 12 may be defined as friction plates, and the other may be defined as separate plates.

The brake mechanism 2 includes a third frictional engagement element 21 coupled to the target rotary member 8T so as to rotate integrally therewith, and a fourth frictional engagement element 22 fixed to the non-rotary member NR. In the present embodiment, the first rotary member 81 is the target rotary member 8T.

The third frictional engagement element 21 and the fourth frictional engagement element 22 are disposed to face each other in the axial direction L. The third frictional engagement element 21 and the fourth frictional engagement element 22 are frictionally engaged with each other by being pressed in the axial direction L. The third frictional engagement element 21 and the fourth frictional engagement element 22 are disposed to be spaced apart, to the axial second side L2, from the first frictional engagement elements 11 and the second frictional engagement elements 12. In the present embodiment, a plurality of the third frictional engagement elements 21 and a plurality of the fourth frictional engagement elements 22 are provided, which are alternately disposed along the axial direction L. Either of the third frictional engagement elements 21 and the fourth frictional engagement elements 22 may be defined as friction plates, and the other may be defined as separate plates.

The first rotary member 81, the second rotary member 82, the first frictional engagement elements 11, the second frictional engagement elements 12, the third frictional engagement elements 21, and the fourth frictional engagement elements 22 are disposed on a first axis X1. That is, the first rotary member 81, the second rotary member 82, the first frictional engagement elements 11, the second frictional engagement elements 12, the third frictional engagement elements 21, and the fourth frictional engagement elements 22 are coaxially disposed.

Figure 2:
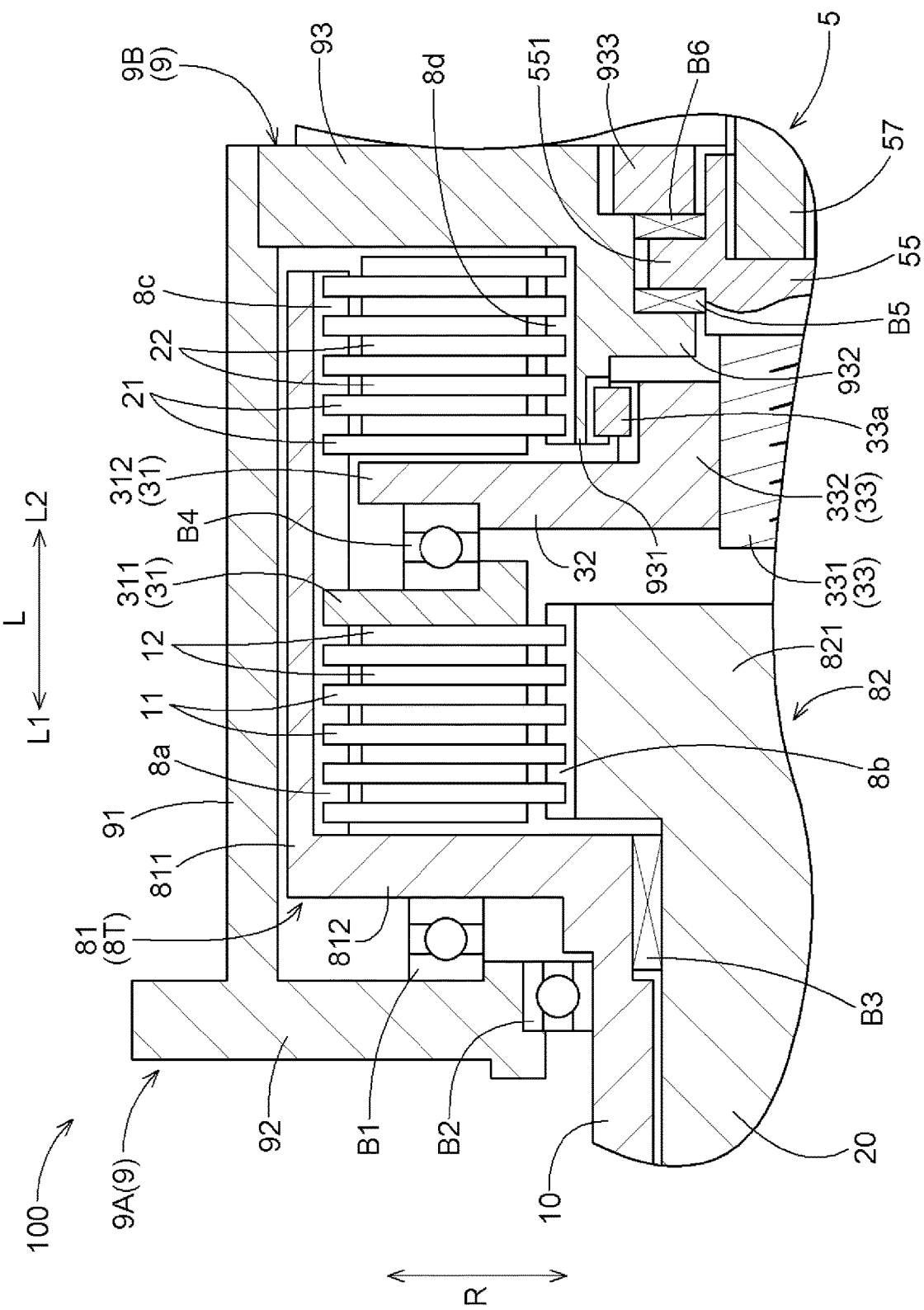
FIG. 2 is a partially enlarged cross-sectional diagram taken along the axial direction of the engagement device according to the first embodiment.

In the present embodiment, the first rotary member 81 includes a first coupling part 8*a* to which the first frictional engagement elements 11 have been coupled, as shown in FIG. 2. The second rotary member 82 includes a second coupling part 8*b* to which the second frictional engagement elements 12 have been coupled. In addition, the target rotary member 8T includes a third coupling part 8*c* to which the third frictional engagement elements 21 have been coupled. That is, in the present embodiment, the first rotary member 81 includes the third coupling part 8*c*. The non-rotary member NR includes a fourth coupling part 8*d* to which the fourth frictional engagement elements 22 have been coupled.

The first coupling part 8*a* is disposed at a position that is on the outer side, in the radial direction R, with respect to the first frictional engagement elements 11 and that overlaps the first frictional engagement elements 11 as viewed in a radial direction along the radial direction R. That is, the first frictional engagement elements 11 are supported from the outer side in the radial direction R by the first coupling part 8*a*. The first frictional engagement elements 11 are supported slidably in the axial direction L in a state where relative rotation with respect to the first coupling part 8*a* is restricted. In the present example, a plurality of spline grooves extending in the axial direction L are formed on the outer peripheral portions of the first frictional engagement elements 11 in a distributed manner in the circumferential direction. On the other hand, similar spline grooves are also formed on the inner peripheral portion of the first coupling part 8*a* in a distributed manner in the circumferential direction. These spline grooves are engaged with each other. Here, regarding the disposing of two elements, "overlapping as viewed in a specific direction" means that when a virtual straight line parallel to the line-of-sight direction is moved in each direction orthogonal to the virtual straight line, a region, where the virtual straight line intersects both of the two elements, exists at least partially.

The second coupling part 8*b* is disposed at a position that is on the inner side, in the radial direction R, with respect to the second frictional engagement elements 12 and that overlaps the second frictional engagement elements 12 and the first coupling part 8*a* as viewed in a radial direction along the radial direction R. That is, the second frictional engagement elements 12 are supported from the inner side in the radial direction R by the second coupling part 8*b*. The second frictional engagement elements 12 are supported slidably in the axial direction L in a state where relative rotation with respect to the second coupling part 8*b* is restricted. In the present example, a plurality of spline grooves extending in the axial direction L are formed on the inner peripheral portions of the second frictional engagement elements 12 in a distributed manner in the circumferential direction. On the other hand, similar spline grooves are also formed on the outer peripheral portion of the second coupling part 8*b* in a distributed manner in the circumferential direction. These spline grooves are engaged with each other.

The third coupling part 8*c* is disposed at a position that is on the outer side, in the radial direction R, with respect to the third frictional engagement elements 21 and that overlaps the third frictional engagement elements 21 as viewed in a radial direction along the radial direction R. That is, the third frictional engagement elements 21 are supported from the outer side in the radial direction R by the third coupling part 8*c*. The third frictional engagement elements 21 are supported slidably in the axial direction L in a state where relative rotation with respect to the third coupling part 8*c* is restricted. In the present example, a plurality of spline grooves extending in the axial direction L are formed on the outer peripheral portions of the third frictional engagement elements 21 in a distributed manner in the circumferential direction. On the other hand, similar spline grooves are also formed on the inner peripheral portion of the third coupling part 8*c* in a distributed manner in the circumferential direction. These spline grooves are engaged with each other.

The fourth coupling part 8*d* is disposed at a position that is on the inner side, in the radial direction R, with respect to the fourth frictional engagement elements 22 and that overlaps the fourth frictional engagement elements 22 and the third coupling part 8*c* as viewed in a radial direction along the radial direction R. That is, the fourth frictional engagement elements 22 are supported from the inner side in the radial direction R by the fourth coupling part 8*d*. The fourth frictional engagement elements 22 are supported slidably in the axial direction L in a state where relative rotation with respect to the fourth coupling part 8*d* is restricted. In the present example, a plurality of spline grooves extending in the axial direction L are formed on the inner peripheral portions of the fourth frictional engagement elements 22 in a distributed manner in the circumferential direction. On the other hand, similar spline grooves are also formed on the outer peripheral portion of the fourth coupling part 8*d* in a distributed manner in the circumferential direction. These spline grooves are engaged with each other.

In the present embodiment, the first rotary member 81 includes a first outer support part 811 and a first radially extending part 812, as shown in FIG. 2.

The first outer support part 811 is formed in a tubular shape whose axis is the first axis X1. In the present embodiment, the first coupling part 8*a* and the third coupling part 8*c* are disposed in the first outer support part 811.

The first radially extending part 812 is formed to extend along the radial direction R based on the first axis X1. In the present embodiment, the first radially extending part 812 is formed to extend from the end portion, on the axial first side L1, of the first outer support part 811 to the inner side in the radial direction R. In the present embodiment, the first radially extending part 812 is rotatably supported with respect to the first side wall portion 92 of the case 9 via a first bearing B1. In the present example, the first bearing B1 is a thrust bearing disposed between, in the axial direction L, the first radially extending part 812 and the first side wall portion 92.

In the present embodiment, the second rotary member 82 includes a first inner support part 821. The first inner support part 821 is disposed on the inner side, in the radial direction R, with respect to the first outer support part 811. In the present embodiment, the second coupling part 8b is disposed in the first inner support part 821.

In the present embodiment, the support wall portion 93 of the case 9 includes a second inner support part 931. The second inner support part 931 is disposed on the inner side, in the radial direction R, with respect to the first outer support part 811. In the present embodiment, the second inner support part 931 is formed in a tubular shape whose axis is the first axis X1. In the present embodiment, the fourth coupling part 8d is disposed in the second inner support part 931.

The pressing mechanism 3 includes: a pressing part 31 disposed between, in the axial direction L, the first frictional engagement elements 11 and the second frictional engagement elements 12, and the third frictional engagement elements 21 and the fourth frictional engagement elements 22; a driven part 32 coupled to the pressing part 31 so as to interlock therewith; and a linear motion mechanism 33 that moves the driven part 32 in the axial direction L.

When the driven part 32 is moved to the axial first side L1 by the linear motion mechanism 33, the first frictional engagement elements 11 and the second frictional engagement elements 12 are pressed by the pressing part 31 to bring the clutch mechanism 1 into an engaged state, and the pressing on the third frictional engagement elements 21 and the fourth frictional engagement elements 22 by the pressing part 31 is released to bring the brake mechanism 2 into a disengaged state. On the other hand, when the driven part 32 is moved to the axial second side L2 by the linear motion mechanism 33, the third frictional engagement elements 21 and the fourth frictional engagement elements 22 are pressed by the pressing part 31 to bring the brake mechanism 2 into an engaged state, and the pressing on the first frictional engagement elements 11 and the second frictional engagement elements 12 by the pressing part 31 is released to bring the clutch mechanism 1 into a disengaged state. As described above, the clutch mechanism 1 and the brake mechanism 2 are selectively engaged in accordance with whether the driven part 32 is moved to the axial first side L1 or to the axial second side L2 by the linear motion mechanism 33.

As described above, the engagement device 100 includes:
the clutch mechanism 1 that selectively engages the first rotary member 81 with the second rotary member 82; and
the brake mechanism 2 that selectively engages the target rotary member 8T that is one of the first rotary member 81 and the second rotary member 82 with the non-rotary member NR,
the engagement device 100 including the pressing mechanism 3 that changes states of engagement of the clutch mechanism 1 and the brake mechanism 2, in which:

the clutch mechanism 1 includes the first frictional engagement element 11 coupled to the first rotary member 81 so as to rotate integrally with the first rotary member 81, and the second frictional engagement element 12 coupled to the second rotary member 82 so as to rotate integrally with the second rotary member 82;
the first frictional engagement element 11 and the second frictional engagement element 12 are disposed to face each other in the axial direction L, and are frictionally engaged with each other by being pressed in the axial direction L;
the brake mechanism 2 includes the third frictional engagement element 21 coupled to the target rotary member 8T so as to rotate integrally with the target rotary member 8T, and the fourth frictional engagement element 22 fixed to the non-rotary member NR;
the third frictional engagement element 21 and the fourth frictional engagement element 22 are disposed to face each other in the axial direction L at positions spaced apart, to the axial second side L2, from the first frictional engagement element 11 and the second frictional engagement element 12, and are frictionally engaged with each other by being pressed in the axial direction L;
the pressing mechanism 3 includes the pressing part 31 disposed between, in the axial direction L, the first frictional engagement element 11 and the second frictional engagement element 12, and the third frictional engagement element 21 and the fourth frictional engagement element 22, the driven part 32 coupled to the pressing part 31 so as to interlock with the pressing part 31, and the linear motion mechanism 33 that moves the driven part 32 in the axial direction L;
the first rotary member 81, the second rotary member 82, the first frictional engagement element 11, the second frictional engagement element 12, the third frictional engagement element 21, and the fourth frictional engagement element 22 are coaxially disposed; and
the clutch mechanism 1 and the brake mechanism 2 are selectively engaged in accordance with whether the driven part 32 is moved to the axial first side L1 or to the axial second side L2 by the linear motion mechanism 33.

According to this configuration, the pressing part 31, that is moved in the axial direction L via the driven part 32 by the linear motion mechanism 33, is disposed between, in the axial direction L, the first frictional engagement element 11 and the second frictional engagement element 12, and the third frictional engagement element and the fourth frictional engagement element that are disposed on the axial second side L2 with respect to the first frictional engagement element 21 and the second frictional engagement element 22. Then, when the driven part 32 is moved to the axial first side L1 by the linear motion mechanism 33, the first frictional engagement element 11 and the second frictional engagement element 12 are pressed by the pressing part 31 to bring the clutch mechanism 1 into an engaged state, and the pressing on the third frictional engagement element 21 and the fourth frictional engagement element 22 by the pressing part 31 is released to bring the brake mechanism 2 into a disengaged state. On the other hand, when the driven part 32 is moved to the axial second side L2 by the linear motion mechanism 33, the third frictional engagement element 21 and the fourth frictional engagement element 22 are pressed by the pressing part 31 to bring the brake mechanism 2 into an engaged state, and the pressing on the first frictional engagement element 11 and the second frictional engagement element 12 by the pressing part 31 is released to bring the clutch mechanism 1 into a disengaged state. As a result, the states of engagement of the clutch mechanism 1 and the brake mechanism 2 can be changed by the common pressing mechanism 3. Therefore, in the configuration including the clutch mechanism 1 and the brake mechanism 2, the engagement device 100 can be downsized.

In the present embodiment, the linear motion mechanism 33 includes a screw shaft 331 rotatably supported with respect to the non-rotary member NR, and a nut member 332 that is screwed to the screw shaft 331.

Screw threads are formed on the outer peripheral portion of the screw shaft 331. The screw shaft 331 is formed to extend along the axial direction L. In the present embodiment, the screw shaft 331 is disposed on the first axis X1.

Grooves that engage with the screw threads of the screw shaft 331 are formed on the inner peripheral portion of the nut member 332. When the screw shaft 331 rotates, the nut member 332 performs a linear motion along the axial direction L in accordance with the rotation direction and the direction of the screw threads of the screw shaft 331. In the present embodiment, the nut member 332 is coupled to the driven part 32 so as to move integrally therewith in the axial direction L. Therefore, in the present embodiment, the pressing part 31 moves in the axial direction L via the nut member 332 and the driven part 32 as the screw shaft 331 rotates.

In the present embodiment, the nut member 332 is supported in a state where the nut member 332 is relatively movable in the axial direction L with respect to the non-rotary member NR and relative rotation is restricted. In the present example, the nut member 332 is disposed on the inner side, in the radial direction R, with respect to the second inner support part 931 of the support wall portion 93 of the case 9. The nut member 332 is coupled to the second inner support part 931 in a state where, by a coupling member 33a disposed between, in the radial direction R, the outer peripheral portion of the nut member 332 and the inner peripheral portion of the second inner support part 931, the nut member is relatively movable in the axial direction L with respect to the case 9 and relative rotation is restricted.

In the present embodiment, the linear motion mechanism 33 is disposed on the axial second side L2 with respect to the second coupling part 8b. Furthermore, the linear motion mechanism 33 is disposed at a position that is on the inner side, in the radial direction R, with respect to the fourth coupling part 8d and that overlaps the fourth coupling part 8d as viewed in a radial direction along the radial direction R. In the present example, the screw shaft 331 and the nut member 332 of the linear motion mechanism 33 are disposed on the axial second side L2 from the first inner support part 821 of the second rotary member 82. Furthermore, the screw shaft 331 and the nut member 332 are disposed on the inner side, in the radial direction R, from the second inner support part 931 of the support wall portion 93 of the case 9.

In the present embodiment, the first rotary member 81 includes the first coupling part 8a to which the first frictional engagement element 11 has been coupled,
the second rotary member 82 includes the second coupling part 8b to which the second frictional engagement element 12 has been coupled,
the target rotary member 8T includes the third coupling part 8c to which the third frictional engagement element 21 has been coupled,
the non-rotary member NR includes the fourth coupling part 8d to which the fourth frictional engagement element 22 has been coupled,
the first coupling part 8a is disposed at a position that is on the outer side, in the radial direction R, with respect to the first frictional engagement element 11 and that overlaps the first frictional engagement element 11 as viewed in a radial direction along the radial direction R,
the third coupling part 8c is disposed at a position that is on the outer side, in the radial direction R, with respect to the third frictional engagement element 21 and that overlaps the third frictional engagement element 21 as viewed in a radial direction along the radial direction R,
the second coupling part 8b is disposed at a position that is on the inner side, in the radial direction R, with respect to the second frictional engagement element 12 and that overlaps the second frictional engagement element 12 and the first coupling part 8a as viewed in a radial direction along the radial direction R,
the fourth coupling part 8d is disposed at a position that is on the inner side, in the radial direction R, with respect to the fourth frictional engagement element 22 and that overlaps the fourth frictional engagement element 22 and the third coupling part 8c as viewed in a radial direction along the radial direction R, and
the linear motion mechanism 33 is disposed on the axial second side L2 with respect to the second coupling part 8b, and is disposed at a position that is on the inner side, in the radial direction R, with respect to the fourth coupling part 8d and that overlaps the fourth coupling part 8d as viewed in a radial direction along the radial direction R, as described above.

According to this configuration, the linear motion mechanism 33 is disposed on the axial second side L2 with respect to the second coupling part 8b of the second rotary member 82. As a result, the dimension, in the radial direction R, of the engagement device 100 can be reduced to a smaller one than in a configuration in which the linear motion mechanism 33 is disposed to overlap the second coupling part 8b as viewed in the radial direction.

According to this configuration, the linear motion mechanism 33 is disposed at a position that is on the inner side, in the radial direction R, with respect to the fourth coupling part 8d of the non-rotary member NR and that overlaps the fourth coupling part 8d as viewed in a radial direction along the radial direction R. As a result, the dimension, in the axial direction L, of the engagement device 100 can be reduced to a smaller one than in a configuration in which the linear motion mechanism 33 is disposed to be shifted in the axial direction L from the fourth coupling part 8d. In addition, it is easy to support, by the non-rotary member NR, the linear motion mechanism 33 disposed on the inner side, in the radial direction R, with respect to the fourth coupling part 8d of the non-rotary member NR, and thus the support structure for the linear motion mechanism 33 is easily simplified.

In the present embodiment, the pressing part 31 includes a first pressing part 311 and a second pressing part 312.

The first pressing part 311 is configured to press the first frictional engagement elements 11 and the second frictional engagement elements 12 in the axial direction L. The second pressing part 312 is configured to press the third frictional engagement elements 21 and the fourth frictional engagement elements 22 in the axial direction L. In the present embodiment, the first pressing part 311 and the second pressing part 312 are made of different members disposed to face each other in the axial direction L. The first pressing part 311 and the second pressing part 312 are supported via a fourth bearing B4 so as to be relatively rotatable with each other. Therefore, in the present embodiment, the first pressing part 311 and the second pressing part 312 are configured to interlock with each other in the axial direction L in a relatively rotatable state. In the present example, the fourth bearing B4 is a thrust bearing disposed between, in the axial direction L, the first pressing part 311 and the second pressing part 312.

The first pressing part 311 is supported in a state where the first pressing part 311 is relatively movable in the axial direction L with respect to the first rotary member 81 or the second rotary member 82 and rotates integrally therewith. In the present embodiment, the first pressing part 311 is supported in a state where the first pressing part 311 is relatively movable in the axial direction L with respect to the first outer support part 811 of the first rotary member 81 and rotates integrally therewith. In the present example, the outer end portion, in the radial direction R, of the first pressing part 311 is coupled to the first coupling part 8a.

The second pressing part 312 is supported in a state where the second pressing part 312 is relatively movable in the axial direction L with respect to the non-rotary member NR and relative rotation is restricted. In the present embodiment, the second pressing part 312 is coupled to the driven part 32 so as to move integrally therewith in the axial direction L. In the present example, the driven part 32 is formed to extend to the inner side, in the radial direction R, from the second pressing part 312. In the present embodiment, the nut member 332 is supported in a state where the nut member 332 is relatively movable in the axial direction L with respect to the non-rotary member NR and relative rotation is restricted, as described above. Therefore, in the present embodiment, the second pressing part 312 is supported in a state where the second pressing part 312 is relatively movable in the axial direction L with respect to the non-rotary member NR via the driven part 32 and the nut member 332 and relative rotation is restricted.

In the present embodiment, the pressing part 31 includes the first pressing part 311 that presses the first frictional engagement elements 11 and the second frictional engagement elements 12 in the axial direction L, and the second pressing part 312 that presses the third frictional engagement elements 21 and the fourth frictional engagement elements 22 in the axial direction L,
the first pressing part 311 is supported in a state where the first pressing part 311 is relatively movable in the axial direction L with respect to the first rotary member 81 or the second rotary member 82 and rotates integrally therewith,
the second pressing part 312 is supported in a state where the second pressing part 312 is relatively movable in the axial direction L with respect to the non-rotary member NR and relative rotation is restricted,
the first pressing part 311 and the second pressing part 312 are configured to interlock with each other in the axial direction L in a relatively rotatable state, and
the driven part 32 is coupled to the second pressing part 312 so as to move integrally therewith in the axial direction L, as described above.

According to this configuration, the driven part 32, that is moved in the axial direction L by the linear motion mechanism 33, is coupled to the second pressing part 312, that is supported in a state where relative rotation with respect to the non-rotary member NR is restricted, so as to move integrally therewith in the axial direction L. As a result, the pressing mechanism 3 is easily simplified as compared with a configuration in which the driven part 32 is coupled to the first pressing part 311 that is supported in a state where the first pressing part 311 rotates integrally with the first rotary member 81 or the second rotary member 82 in order to move integrally therewith in the axial direction L.

In the present embodiment, the screw shaft 331 is disposed on the first axis X1, as described above. That is, in the present embodiment, the screw shaft 331 is disposed coaxially with the first frictional engagement elements 11, the second frictional engagement elements 12, the third frictional engagement elements 21, and the fourth frictional engagement elements 22. In the present embodiment, the screw shaft 331 is disposed on the inner side, in the radial direction R, with respect to the first frictional engagement elements 11, the second frictional engagement elements 12, the third frictional engagement elements 21, and the fourth frictional engagement elements 22.

In the present embodiment, the linear motion mechanism 33 includes the screw shaft 331 rotatably supported with respect to the non-rotary member NR, and the nut member 332 that is screwed to the screw shaft 331,
the nut member 332 is coupled to the driven part 32 so as to move integrally therewith in the axial direction L, and
the screw shaft 331 is disposed coaxially with the first frictional engagement elements 11, the second frictional engagement elements 12, the third frictional engagement elements 21, and the fourth frictional engagement elements 22 and is disposed on the inner side, in the radial direction R, with respect thereto, as described above.

According to this configuration, the screw shaft 331 for moving the nut member 332 in the axial direction L is disposed on the inner side, in the radial direction R, with respect to the first frictional engagement elements 11, the second frictional engagement elements 12, the third frictional engagement elements 21, and the fourth frictional engagement elements 22. As a result, driving force for rotationally driving the screw shaft 331 is easily transmitted to the screw shaft 331 from the outer side, in the axial direction L, with respect to the frictional engagement elements 11, 12, 21, and 22. Therefore, it is easy to realize a structure in which the pressing part 31, disposed between, in the axial direction L, the first frictional engagement elements 11 and the second frictional engagement elements 12, and the third frictional engagement elements 21 and the fourth frictional engagement elements 22, is movable in the axial direction L via the nut member 332 and the driven part 32.

According to the present configuration, the screw shaft 331 of the linear motion mechanism 33 is easily disposed to overlap at least a part of the first frictional engagement elements 11, the second frictional engagement elements 12, the third frictional engagement elements 21, and the fourth frictional engagement elements 22 as viewed in a radial direction along the radial direction R. As a result, an increase in the size, in the axial direction L, of the engagement device 100 due to the arrangement of the linear motion mechanism 33 can be suppressed.

In the present embodiment, the engagement device 100 further includes a driving source 4 for rotationally driving the screw shaft 331, and a transmission mechanism 5 for transmitting power between the driving source 4 and the screw shaft 331, as shown in FIG. 1.

In the present embodiment, the driving source 4 is disposed on a second axis X2 different from the first axis X1. That is, in the present embodiment, the driving source 4 is disposed on an axis different from the screw shaft 331. An arrangement region, in the axial direction L, for the driving source 4 overlaps an arrangement region, in the axial direction L, for the first rotary member 81. In the present embodiment, the transmission mechanism 5 is disposed on the axial second side L2 with respect to the linear motion mechanism 33.

In the present embodiment, the first rotary member 81 is coupled to a first shaft member 10 so as to rotate integrally therewith, as shown in FIG. 2. The first shaft member 10 is disposed to extend from the first rotary member 81 to the axial first side L1. In the present embodiment, the first shaft member 10 is formed in a tubular shape whose axis is the first axis X1. The first shaft member 10 is formed to extend from the inner end portion, in the radial direction R, of the first outer support part 811 of the first rotary member 81 to the axial first side L1. In the present example, the first shaft member 10 is formed integrally with the first rotary member 81. In the present embodiment, the first shaft member 10 is disposed to penetrate the first side wall portion 92 of the case 9 in the axial direction L. The first shaft member 10 is rotatably supported with respect to the first side wall portion 92 via a second bearing B2. In the present example, the second bearing B2 is a radial bearing disposed between, in the radial direction R, the first shaft member 10 and the first side wall portion 92.

In the present embodiment, the second rotary member 82 is coupled to a second shaft member 20 so as to rotate integrally therewith. The second shaft member 20 is disposed to extend from the second rotary member 82 to the axial first side L1. In the present embodiment, the second shaft member 20 is formed to extend from the first inner support part 821 of the second rotary member 82 to the axial first side L1. The second shaft member 20 is disposed on the first axis X1. In the present example, the second shaft member 20 is formed integrally with the second rotary member 82. In the present embodiment, the second shaft member 20 is disposed to pass through the inner side, in the radial direction R, of the first shaft member 10. The second shaft member 20 is supported to be relatively rotatable with respect to the first shaft member 10 via a third bearing B3. In the present example, the third bearing B3 is a radial bearing disposed between, in the radial direction R, the first shaft member 10 and the second shaft member 20.

The engagement device 100 is provided, for example, in a vehicle driving device that transmits a driving force from a driving force source, such as an internal combustion engine, to wheels. In this case, one of the first shaft member 10 and the second shaft member 20 is drive-coupled to the driving force source such as an internal combustion engine. The other of the first shaft member 10 and the second shaft member 20 is drive-coupled to wheels.

In the present embodiment, the driving source 4 for rotationally driving the screw shaft 331 and the transmission mechanism 5 for transmitting power between the driving source 4 and the screw shaft 331 are further included,
the driving source 4 is disposed on an axis different from the screw shaft,
the arrangement region, in the axial direction L, for the driving source 4 overlaps the arrangement region, in the axial direction L, for the first rotary member 81,
the transmission mechanism 5 is disposed on the axial second side L2 with respect to the linear motion mechanism 33,
the first shaft member 10, disposed to extend from the first rotary member 81 to the axial first side L1, is coupled to the first rotary member 81 so as to rotate integrally therewith, and
the second shaft member 20, disposed to extend from the second rotary member 82 to the axial first side L1, is coupled to the second rotary member 82 so as to rotate integrally therewith, as described above.

According to this configuration, the dimension, in the axial direction L, of the engagement device 100 can be reduced to a smaller one than in a configuration in which the driving source 4 is disposed at a position that is on the same axis as and is shifted in the axial direction L from the first rotary member 81.

In the present embodiment, the transmission mechanism 5 includes a first gear 51, a second gear 52, a third gear 53, a fourth gear 54, and a coupling body 55, as shown in FIG. 1.

The first gear 51 is coupled to the output shaft of the driving source 4 so as to rotate integrally therewith. In the present embodiment, the first gear 51 is disposed on the second axis X2. The first gear 51 is disposed on the axial second side L2 with respect to the driving source 4.

The second gear 52 meshes with the first gear 51. In the present embodiment, the second gear 52 is formed to have a larger diameter than the first gear 51. The third gear 53 is coupled to the second gear 52 so as to rotate integrally therewith. In the present embodiment, the third gear 53 is formed to have a smaller diameter than the second gear 52. The third gear 53 is disposed on the axial first side L1 with respect to the second gear 52. In the present embodiment, the second gear 52 and the third gear 53 are disposed on a third axis X3 different from the first axis X1 and the second axis X2. In the present embodiment, the second gear 52 and the third gear 53 are rotatably supported with respect to the non-rotary member NR by a first shaft body 56. The first shaft body 56 is formed to extend along the axial direction L. In the present embodiment, the end portion, on the axial first side L1, of the first shaft body 56 is rotatably supported with respect to the support wall portion 93. The end portion, on the axial second side L2, of the first shaft body 56 is rotatably supported with respect to the cover portion 94.

The fourth gear 54 meshes with the third gear 53. In the present embodiment, the fourth gear 54 is formed to have a larger diameter than the third gear 53. In the present embodiment, the fourth gear 54 is disposed on the first axis X1. In the present embodiment, the fourth gear 54 is rotatably supported with respect to the non-rotary member NR by a second shaft body 57. The second shaft body 57 is formed to extend along the axial direction L. In the present embodiment, the end portion, on the axial second side L2, of the second shaft body 57 is rotatably supported with respect to the cover portion 94. On the other hand, the end portion, on the axial first side L1, of the second shaft body 57 is coupled to the coupling body 55 so as to rotate integrally therewith.

In the present embodiment, the number of teeth of the second gear 52 is larger than the number of teeth of the first gear 51. The number of teeth of the fourth gear 54 is larger than the number of teeth of the third gear 53 that rotates integrally with the second gear 52. Therefore, in the present embodiment, the rotation transmitted from the driving source 4 to the first gear 51 is decelerated between the first gear 51 and the second gear 52, which is transmitted to the third gear 53. Then, the rotation of the third gear 53 is decelerated between the third gear 53 and the fourth gear 54, which is transmitted to the coupling body 55.

The coupling body 55 couples the fourth gear 54 to the screw shaft 331 such that the fourth gear 54 and the screw shaft rotate integrally with each other. In the present embodiment, the coupling body 55 is formed in a tubular shape whose axial second side L2 is opened. The coupling body 55 and the second shaft body 57 are coupled to rotate integrally with each other in a state where the second shaft body 57 is disposed on the inner side, in the radial direction R, with respect to the coupling body 55. In the present embodiment, the coupling body 55 and the screw shaft 331 are coupled to rotate integrally with each other in a state where the screw shaft 331 is disposed to extend from the coupling body 55 to the axial first side L1. In the present embodiment, the coupling body 55, the second shaft body 57, and the screw shaft 331 are disposed to penetrate the support wall portion 93 in the axial direction L.

In the present embodiment, the coupling body 55 is disposed on the inner side, in the radial direction R, with respect to the second inner support part 931 of the support wall portion 93 formed in a tubular shape, as shown in FIG. 2. In the present embodiment, the coupling body 55 is provided with a supported part 551 formed to protrude from the coupling body 55 to the outer side in the radial direction R. The second inner support part 931 is provided with a bearing support part 932 that protrudes from the second inner support part 931 to the inner side in the radial direction R and that is formed to face the supported part 551 from the axial first side L1. The supported part 551 is rotatably supported with respect to the bearing support part 932 via a fifth bearing B5. As a result, the coupling body 55 is rotatably supported with respect to the non-rotary member NR in a state where the coupling body is restricted from relatively moving, to the axial first side L1, with respect to the non-rotary member NR. In the present example, the fifth bearing B5 is a thrust bearing disposed between, in the axial direction L, the supported part 551 and the bearing support part 932.

In the present embodiment, a lid 933 having an annular shape is fixed to the support wall portion 93 so as to face the supported part 551 from the axial second side L2. The supported part 551 is rotatably supported with respect to the lid 933 via a sixth bearing B6. As a result, the coupling body 55 is rotatably supported with respect to the non-rotary member NR in a state where the coupling body is restricted from relatively moving, to the axial second side L2, with respect to the non-rotary member NR. In the present example, the sixth bearing B6 is a thrust bearing disposed between, in the axial direction L, the supported part 551 and the lid 933.

In the present embodiment, there is provided a pressure sensor (not shown) that detects a pressing force applied to the first frictional engagement elements 11 and the second frictional engagement elements 12 by the pressing part 31 and a pressing force applied to the third frictional engagement elements 21 and the fourth frictional engagement elements 22 by the pressing part 31. The pressure sensor is disposed, for example, between, in the axial direction L, the supported part 551 and the bearing support part 932 or between, in the axial direction L, the supported part 551 and the lid 933. As a result, the force, that is transmitted to the coupling body 55 via the driven part 32, the nut member 332, and the screw shaft 331 and is received by the pressing part 31 from the first frictional engagement elements 11, the second frictional engagement elements 12, the third frictional engagement elements 21, and the fourth frictional engagement elements 22, can be measured by the pressure sensor. Then, based on the measured force, the pressing force by the pressing part 31 applied to the first frictional engagement elements 11 and the second frictional engagement elements 12, and the pressing force by the pressing part 31 applied to the third frictional engagement elements 21 and the fourth frictional engagement elements 22, can be calculated.

2. Engagement Device According to Second Embodiment

Hereinafter, an engagement device 100 according to a second embodiment will be described with reference to FIGS. 3 and 4. The present embodiment is different from the first embodiment in that a second rotary member 82 is a target rotary member 8T. Hereinafter, differences from the first embodiment will be mainly described. Note that points that are not particularly described are the same as those in the first embodiment.

Figure 3:
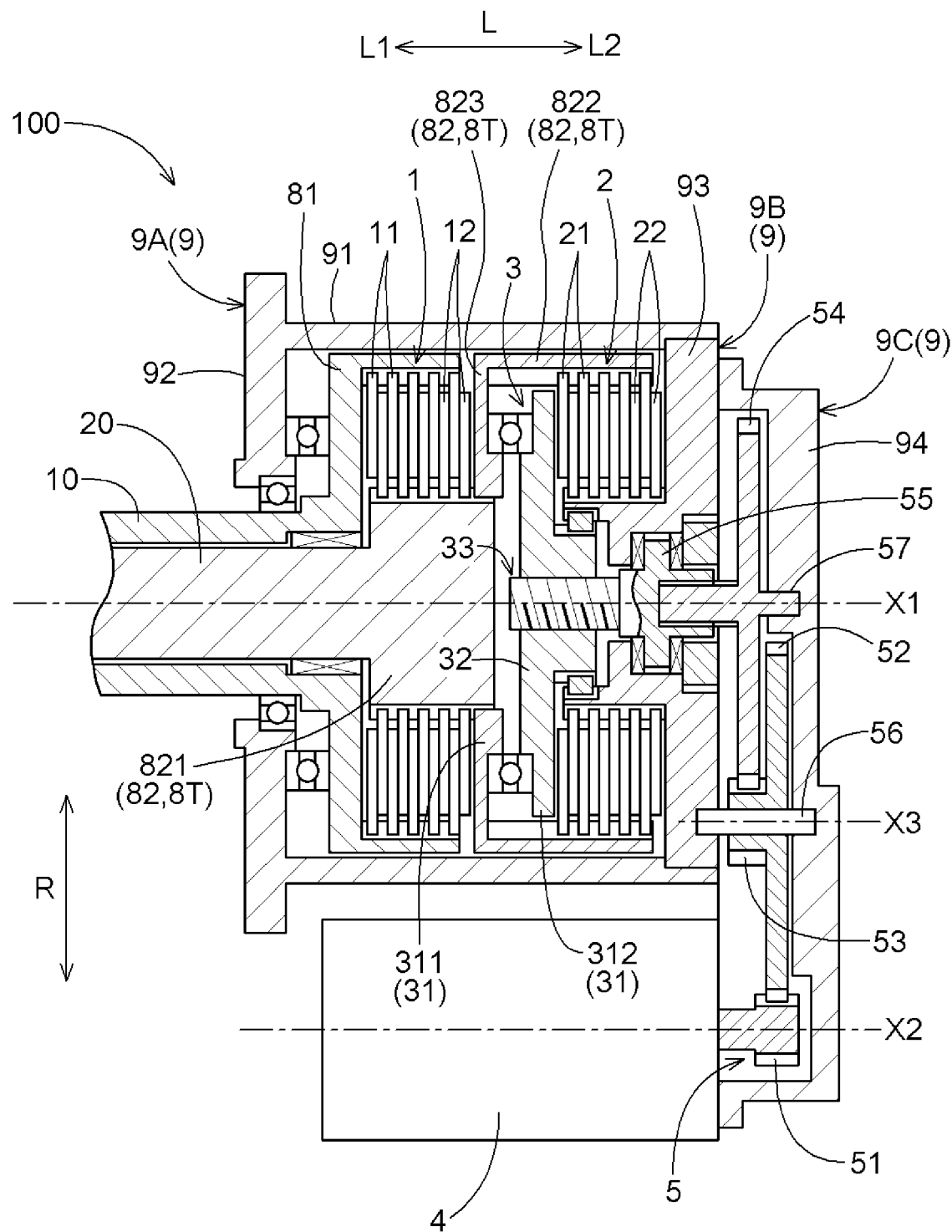
FIG. 3 is a cross-sectional diagram taken along an axial direction of an engagement device according to a second embodiment.
Figure 4:
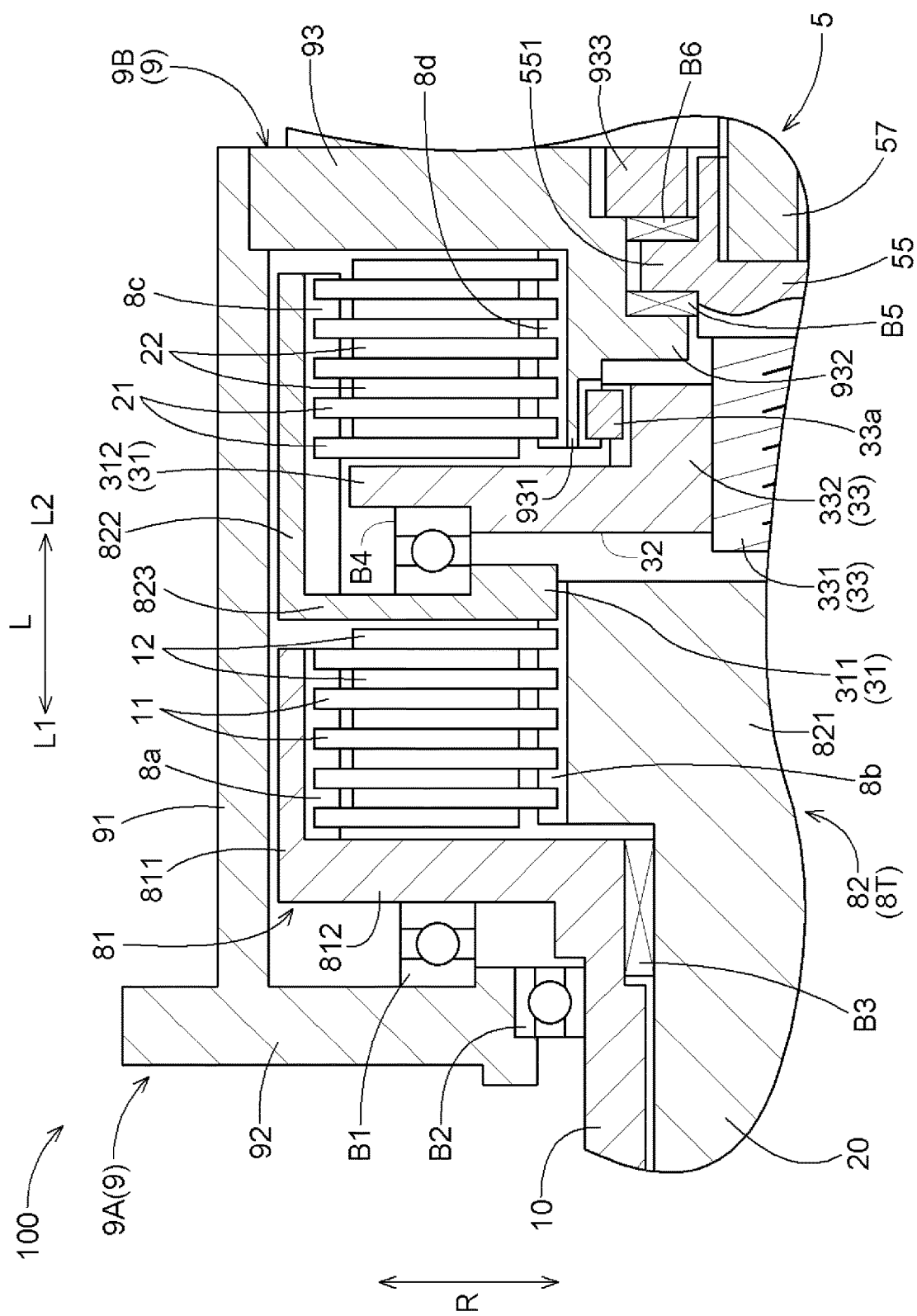
FIG. 4 is a partially enlarged cross-sectional diagram taken along the axial direction of the engagement device according to the second embodiment.

In the present embodiment, the second rotary member 82 is the target rotary member 8T, as shown in FIGS. 3 and 4. Therefore, in the present embodiment, the second rotary member 82 includes a third coupling part 8c to which third frictional engagement elements 21 have been coupled.

In the present embodiment, the second rotary member 82 further includes, in addition to the first inner support part 821, a second outer support part 822 and a second radially extending part 823, as shown in FIG. 4.

The second outer support part 822 is formed in a tubular shape whose axis is a first axis X1. In the present embodiment, the third coupling part 8c is disposed in the second outer support part 822. On the other hand, in the present embodiment, the third coupling part 8c is not disposed in a first outer support part 811 of the first rotary member 81, and a first coupling part 8a is disposed. The dimension, in an axial direction L, of the first outer support part 811 in the present embodiment is smaller than the dimension, in the axial direction L, of the first outer support part 811 in the first embodiment. The first outer support part 811 is disposed on the axial first side L1 with respect to the second outer support part 822.

The second radially extending part 823 is formed to extend along the radial direction R based on the first axis X1. In the present embodiment, the second radially extending part 823 is formed to extend from the end portion, on the axial first side L1, of the second outer support part 822 to the inner side in the radial direction R. The second radially extending part 823 is supported in a state where the second radially extending part 823 is relatively movable in the axial direction L with respect to the first inner support part 821 and rotates integrally therewith. In the present example, the inner end portion, in the radial direction R, of the second radially extending part 823 is coupled to a second coupling part 8b. In the present embodiment, the second radially extending part 823 is coupled to a first pressing part 311 so as to rotate integrally therewith. In the present example, the second radially extending part 823 is formed integrally with the first pressing part 311.

3. Vehicle Driving Device According to First Embodiment

Figure 5:
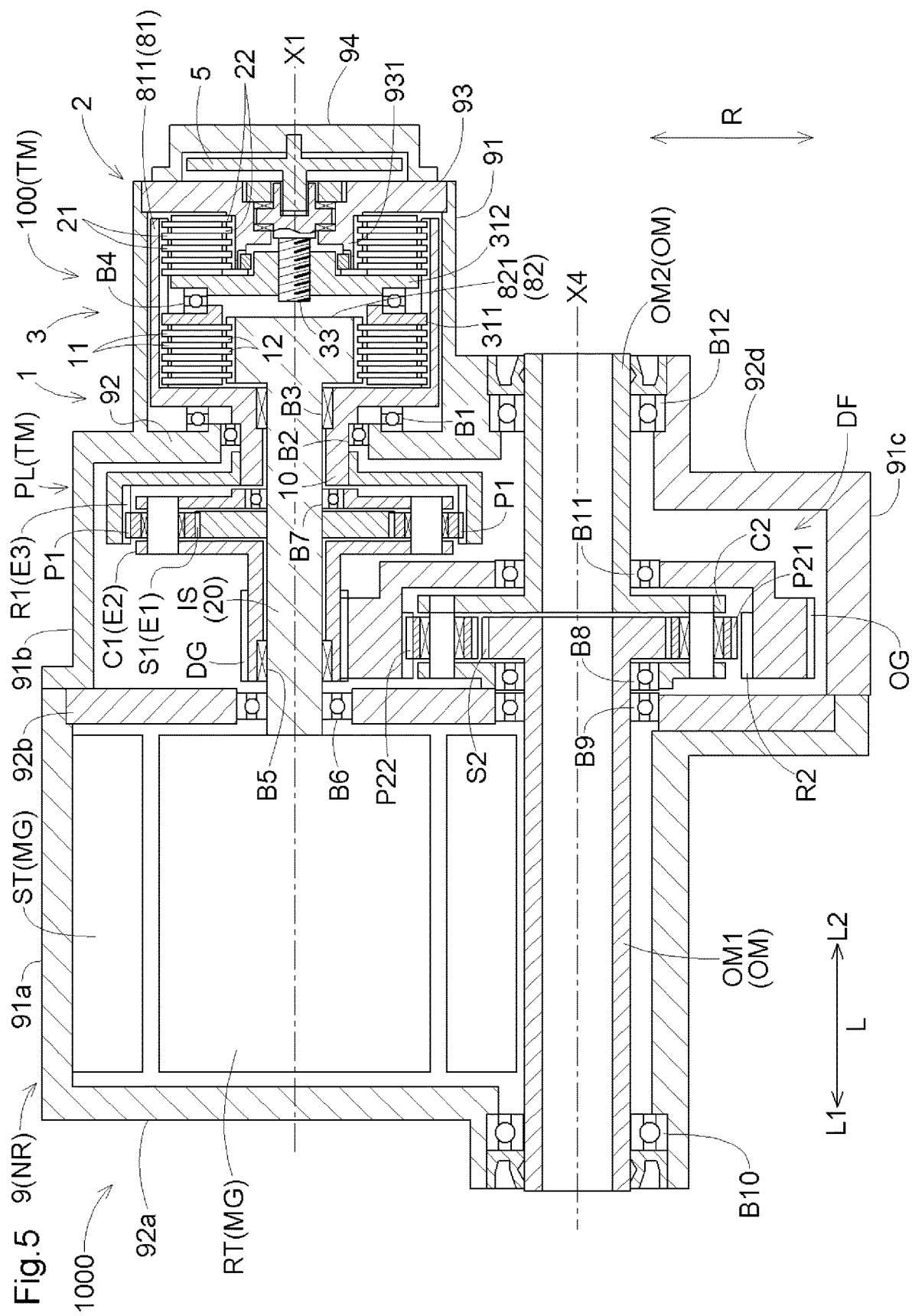
FIG. 5 is a cross-sectional diagram taken along an axial direction of a vehicle driving device according to the first embodiment.
Figure 6:
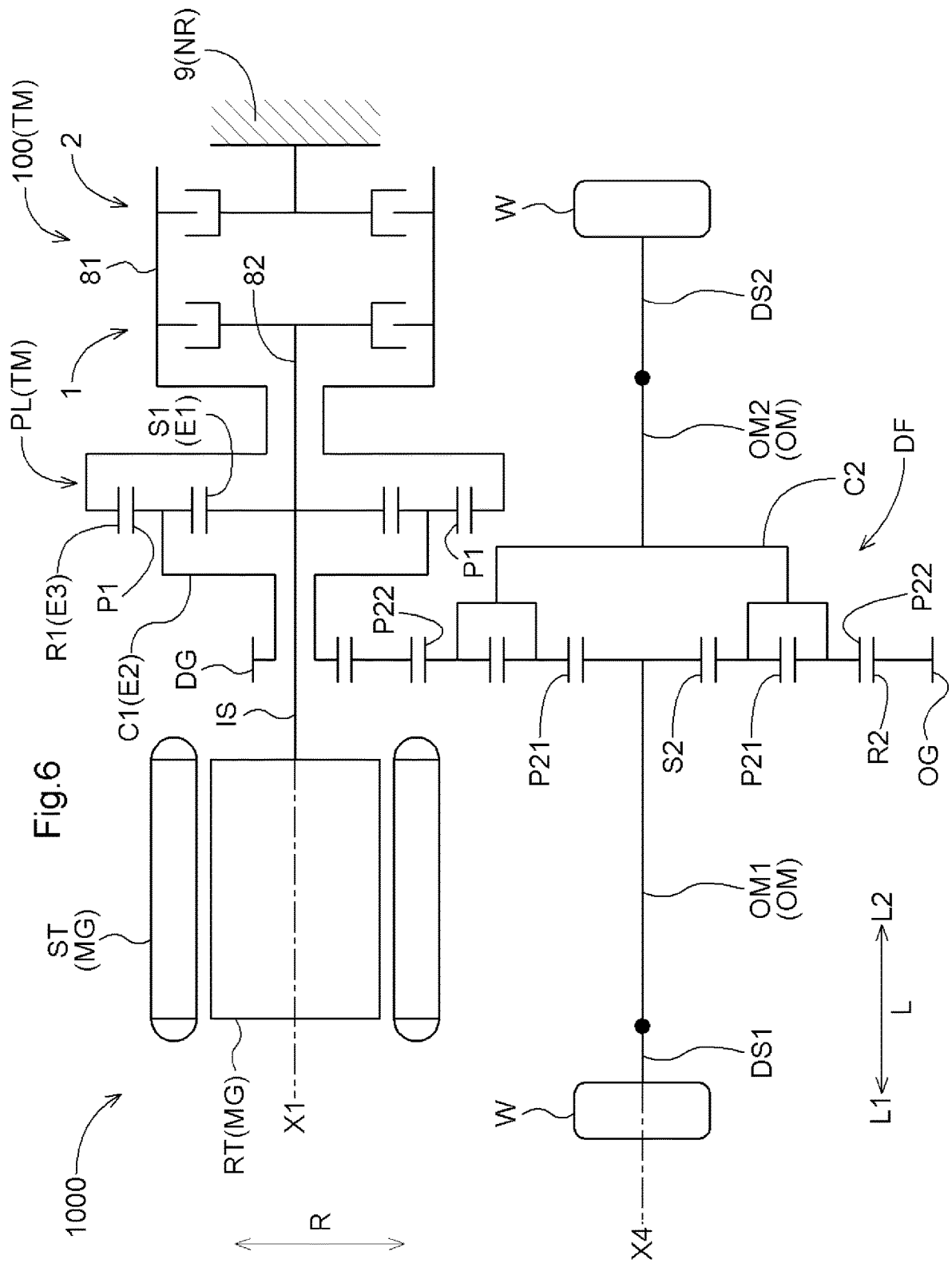
FIG. 6 is a skeleton diagram of the vehicle driving device according to the first embodiment.

Hereinafter, a vehicle driving device 1000 according to the first embodiment including the engagement device 100 according to the first embodiment will be described with reference to FIGS. 5 to 9. As shown in FIGS. 5 and 6, the vehicle driving device 1000 includes a rotating electrical machine MG including a stator ST and a rotor RT, an input shaft IS that rotates integrally with the rotor RT, an output gear OG drive-coupled to wheels W (see FIG. 6), a drive gear DG coupled to the output gear OG so as to rotate in an interlocked manner therewith, and a transmission TM including a planetary gear mechanism PL and the engagement device 100. In the present embodiment, the vehicle driving device 1000 further includes a pair of output members OM, each of which rotates integrally with the wheels W different from the other wheels W, and a differential gear mechanism DF that distributes the rotation of the output gear OG to the pair of output members OM.

The drive gear DG, the planetary gear mechanism PL, and the engagement device 100 are disposed on the first axis X1 that is the axis of rotation of the rotor RT. That is, the rotor RT, the planetary gear mechanism PL, the engagement device 100, and the drive gear DG are coaxially disposed. In the present embodiment, the output gear OG, the pair of output members OM, and the differential gear mechanism DF are disposed on a fourth axis X4 different from the first axis X1. In the present example, the first axis X1 and the fourth axis X4 are arranged in parallel to each other.

In the axial direction L in the present embodiment, the side, on which the rotating electrical machine MG is disposed, with respect to the input shaft IS is defined as an axial first side L1, and the opposite side is defined as an axial second side L2.

The rotating electrical machine MG functions as a driving force source for the wheels W (see FIG. 6). The rotating electrical machine MG has a function as a motor (electric motor) that receives supply of electric power and generates power, and a function as a generator (generation device) that receives supply of power and generates electric power. Specifically, the rotating electrical machine MG is electrically connected to a power storage device (not shown) such as a battery or a capacitor. The rotating electrical machine MG is powered by the electric power stored in the power storage device, and generates a driving force. In addition, the rotating electrical machine MG generates power by the driving force transmitted from the wheel W side to charge the power storage device.

The stator ST of the rotating electrical machine MG is fixed to the non-rotary member NR. The rotor RT of the rotating electrical machine MG is rotatably supported with respect to the stator ST.

In the present embodiment, the non-rotary member NR is the case 9, as shown in FIG. 5. The case 9 houses the rotating electrical machine MG, the input shaft IS, the output gear OG, the drive gear DG, the transmission TM, the output members OM, and the differential gear mechanism DF. In the present embodiment, the case 9 further includes, in addition to the first peripheral wall portion 91, the first side wall portion 92, the support wall portion 93, and the cover portion 94, a second peripheral wall portion 91a, a third peripheral wall portion 91b, a fourth peripheral wall portion 91c, a second side wall portion 92a, a third side wall portion 92b, and a fourth side wall portion 92d.

The second peripheral wall portion 91a is formed to cover the outer side, in the radial direction R, of the rotating electrical machine MG. The third peripheral wall portion 91b is formed to cover the outer sides, in the radial direction R, of the drive gear DG and the planetary gear mechanism PL. The fourth peripheral wall portion 91c is formed to cover the outer sides, in the radial direction R, of the pair of output members OM and the differential gear mechanism DF. In the present embodiment, the first peripheral wall portion 91 is formed to cover the outer side, in the radial direction R, of the engagement device 100.

The second side wall portion 92a is formed to cover the axial first side L1 of the rotating electrical machine MG. The third side wall portion 92b is formed to separate, in the axial direction L, the rotating electrical machine MG from the output gear OG, the drive gear DG, and the differential gear mechanism DF. The fourth side wall portion 92d is formed to cover the axial second side L2 of the differential gear mechanism DF. In the present embodiment, the support wall portion 93 is formed to cover the axial second side L2 of the engagement device 100. The cover portion 94 is formed to cover the axial second side L2 of the support wall portion 93. The first side wall portion 92 is formed to separate, in the axial direction L, the planetary gear mechanism PL from the engagement device 100.

In the present embodiment, the second peripheral wall portion 91a is formed in a tubular shape having an axis along the axial direction L. The opening, on the axial first side L1, of the second peripheral wall portion 91a is closed by the second side wall portion 92a. The opening, on the axial second side L2, of the second peripheral wall portion 91a is closed by the third side wall portion 92b. In the present example, the second peripheral wall portion 91a and the second side wall portion 92a are integrally formed. The third side wall portion 92b is fitted into the opening, on the axial first side L1, of the second peripheral wall portion 91a from the axial second side L2.

In the present embodiment, the third peripheral wall portion 91b is formed in a tubular shape having an axis along the axial direction L. The opening, on the axial second side L2, of the third peripheral wall portion 91b is closed by the first side wall portion 92. In the present embodiment, the fourth peripheral wall portion 91c is formed in a tubular shape having an axis along the axial direction L. The opening, on the axial second side L2, of the fourth peripheral wall portion 91c is closed by the fourth side wall portion 92d. In the present example, the third peripheral wall portion 91b, the fourth peripheral wall portion 91c, the first side wall portion 92, and the fourth side wall portion 92d are integrally formed. The end portions, on the axial first side L1, of the third peripheral wall portion 91b and the fourth peripheral wall portion 91c and the end portions, on the axial second side L2, of the second peripheral wall portion 91a are joined to each other such that the openings, on the axial first side L1, of the third peripheral wall portion 91b and the fourth peripheral wall portion 91c are closed by the third side wall portion 92b.

In the present embodiment, the first peripheral wall portion 91 is formed in a tubular shape having an axis along the axial direction L. The opening, on the axial second side L2, of the first peripheral wall portion 91 is closed by the support wall portion 93. In the present example, the first peripheral wall portion 91 is formed integrally with the first side wall portion 92 such that the opening, on the axial first side L1, of the first peripheral wall portion 91 is closed by the first side wall portion 92. The support wall portion 93 is fitted into the opening, on the axial second side L2, of the first peripheral wall portion 91 from the axial second side L2. Furthermore, the cover portion 94 is joined to the support wall portion 93 from the axial second side L2.

The planetary gear mechanism PL includes a first rotary element E1, a second rotary element E2, and a third rotary element E3. The planetary gear mechanism PL is configured such that the order of the rotational speeds of the first rotary element E1, the second rotary element E2, and the third rotary element E3 becomes the described order. Here, the "order of the rotational speeds" refers to the order of the rotational speeds of the respective rotary elements in their rotational states. The rotational speeds of the respective rotary elements change depending on the rotational state of the planetary gear mechanism, but the sort order of the high and low rotational speeds of the respective rotary elements is constant because it is determined by the structure of the planetary gear mechanism. Note that the order of the rotational speeds of the respective rotary elements is equal to the order of arrangement of the respective rotary elements in a speed diagram (see FIG. 7, etc.). Here, the "order of arrangement of the respective rotary elements in a speed diagram" refers to an order in which axes corresponding to the respective rotary elements in the speed diagram are arranged along a direction orthogonal to the axes. The directions of arrangement of the axes corresponding to the respective rotary elements in the speed diagram vary depending on how the speed diagram is drawn, but the order of arrangement thereof is constant because it is determined by the structure of the planetary gear mechanism.

In the present embodiment, the planetary gear mechanism PL is a planetary gear mechanism of a single pinion type including a first sun gear S1, a first carrier C1, and a first ring gear R1.

The first rotary element E1 is coupled to the input shaft IS so as to rotate integrally therewith. In the present embodiment, the first rotary element E1 is the first sun gear S1.

The second rotary element E2 is coupled to the drive gear DG so as to rotate integrally therewith. In the present embodiment, the second rotary element E2 is the first carrier C1. The first carrier C1 rotatably supports a first pinion gear P1 that meshes with the first sun gear S1 and the first ring gear R1. The first pinion gear P1 rotates around the axis thereof (rotates on its own axis) and rotates (revolves) around the first sun gear S1 together with the first carrier C1. A plurality of the first pinion gears P1 are provided to be spaced apart from each other along the revolution locus thereof.

The third rotary element E3 is switched, in accordance with the state of engagement of the engagement device 100, between a first state where the third rotary element E3 is coupled to the non-rotary member NR and a second state where the third rotary element E3 is coupled to the first rotary element E1 or the second rotary element E2 so as to rotate integrally therewith. In the present embodiment, the third rotary element E3 is the first ring gear R1. The first ring gear R1 is an internal tooth gear disposed on the outer side, in the radial direction R, with respect to the first sun gear S1 and the first carrier C1.

In the present embodiment, the engagement device 100 includes a clutch mechanism 1, a brake mechanism 2, and a pressing mechanism 3.

The clutch mechanism 1 is configured to selectively engage a first rotary member 81 with a second rotary member 82 that are supported to be relatively rotatable with each other. The clutch mechanism 1 includes a first frictional engagement element 11 coupled to the first rotary member 81 so as to rotate integrally therewith, and a second frictional engagement element 12 coupled to the second rotary member 82 so as to rotate integrally therewith.

The first frictional engagement element 11 and the second frictional engagement element 12 are disposed to face each other in the axial direction L. The first frictional engagement element 11 and the second frictional engagement element 12 are frictionally engaged with each other by being pressed in the axial direction L. In the present embodiment, a plurality of the first frictional engagement elements 11 and a plurality of the second frictional engagement elements 12 are provided, which are alternately disposed along the axial direction L. Either of the first frictional engagement elements 11 and the second frictional engagement elements 12 may be defined as friction plates, and the other may be defined as separate plates.

The brake mechanism 2 is configured to selectively engage the first rotary member 81 with the non-rotary member NR. The brake mechanism 2 includes a third frictional engagement element 21 coupled to the first rotary member 81 so as to rotate integrally therewith, and a fourth frictional engagement element 22 fixed to the non-rotary member NR.

The third frictional engagement element 21 and the fourth frictional engagement element 22 are disposed to face each other in the axial direction L. The third frictional engagement element 21 and the fourth frictional engagement element 22 are frictionally engaged with each other by being pressed in the axial direction L. The third frictional engagement element 21 and the fourth frictional engagement element 22 are disposed to be spaced apart, to the axial second side L2, from the first frictional engagement elements 11 and the second frictional engagement elements 12. In the present embodiment, a plurality of the third frictional engagement elements 21 and a plurality of the fourth frictional engagement elements 22 are provided, which are alternately disposed along the axial direction L. Either of the third frictional engagement elements 21 and the fourth frictional engagement elements 22 may be defined as friction plates, and the other may be defined as separate plates.

In the present embodiment, the first rotary member 81 includes a first outer support part 811. The first outer support part 811 is formed in a tubular shape whose axis is the first axis X1. The first outer support part 811 supports the first frictional engagement elements 11 and the third frictional engagement elements 21 from the outer side in the radial direction R. In the present example, a plurality of spline grooves extending in the axial direction L are formed on the outer peripheral portions of the first frictional engagement elements 11 and the third frictional engagement elements 21 in a distributed manner in the circumferential direction. On the other hand, similar spline grooves are also formed on the inner peripheral portion of the first outer support part 811 in a distributed manner in the circumferential direction. These spline grooves are engaged with each other.

In the present embodiment, the second rotary member 82 includes a first inner support part 821. The first inner support part 821 is disposed on the inner side, in the radial direction R, with respect to the first outer support part 811. The first inner support part 821 supports the second frictional engagement elements 12 from the inner side in the radial direction R. In the present example, a plurality of spline grooves extending in the axial direction L are formed on the inner peripheral portions of the second frictional engagement elements 12 in a distributed manner in the circumferential direction. On the other hand, similar spline grooves are also formed on the outer peripheral portion of the first inner support part 821 in a distributed manner in the circumferential direction. These spline grooves are engaged with each other.

In the present embodiment, the support wall portion 93 of the case 9 includes a second inner support part 931. The second inner support part 931 is disposed on the inner side, in the radial direction R, with respect to the first outer support part 811, and is disposed on the axial second side L2 with respect to the first inner support part 821. The second inner support part 931 supports the fourth frictional engagement elements 22 from the inner side in the radial direction R. In the present example, a plurality of spline grooves extending in the axial direction L are formed on the inner peripheral portions of the fourth frictional engagement elements 22 in a distributed manner in the circumferential direction. On the other hand, similar spline grooves are also formed on the outer peripheral portion of the second inner support part 931 in a distributed manner in the circumferential direction. These spline grooves are engaged with each other.

In the present embodiment, the first rotary member 81 is coupled to a first shaft member 10 so as to rotate integrally therewith. The first shaft member 10 is disposed to extend from the first rotary member 81 to the axial first side L1. The first shaft member 10 is disposed to penetrate the first side wall portion 92 of the case 9 in the axial direction L. The first shaft member 10 is coupled, on the axial first side L1 from the first side wall portion 92, to the first ring gear R1 of the planetary gear mechanism PL so as to rotate integrally therewith. The first shaft member 10 is rotatably supported with respect to the first side wall portion 92 via a second bearing B2.

In the present embodiment, the second rotary member 82 is disposed on the inner side, in the radial direction R, with respect to the first rotary member 81. The second rotary member 82 is coupled to the second shaft member 20 so as to rotate integrally therewith. The second shaft member 20 is disposed to extend from the second rotary member 82 to the axial first side L1. The second shaft member 20 is disposed on the inner side, in the radial direction R, with respect to the first shaft member 10. The second shaft member 20 is supported to be relatively rotatable with respect to the first shaft member 10 via a third bearing B3. In the present embodiment, the input shaft IS corresponds to the second shaft member 20.

The pressing mechanism 3 is configured to change states of engagement of the clutch mechanism 1 and the brake mechanism 2. In the present embodiment, the pressing mechanism 3 includes a first pressing part 311 that presses the first frictional engagement elements 11 and the second frictional engagement elements 12, a second pressing part 312 that presses the third frictional engagement elements 21 and the fourth frictional engagement elements 22, a linear motion mechanism 33 that moves the first pressing part 311 and the second pressing part 312 in the axial direction L, and a transmission mechanism 5 that transmits power of the driving source 4 to the linear motion mechanism 33.

In the present embodiment, the first pressing part 311 and the second pressing part 312 are made of different members disposed to face each other in the axial direction L. The first pressing part 311 and the second pressing part 312 are supported via a fourth bearing B4 so as to be relatively rotatable with each other. Therefore, in the present embodiment, the first pressing part 311 and the second pressing part 312 are configured to interlock with each other in the axial direction L in a relatively rotatable state. In the present example, the fourth bearing B4 is a thrust bearing disposed between, in the axial direction L, the first pressing part 311 and the second pressing part 312.

In the present embodiment, the linear motion mechanism 33 includes a ball screw. In the present example, the nut member 332 screwed to the screw shaft 331 of the linear motion mechanism 33 is coupled to the second pressing part 312 so as to move integrally therewith in the axial direction L.

In the present embodiment, the transmission mechanism 5 includes a plurality of gears. In the present example, the rotation from the driving source 4 is decelerated between the gears that mesh with each other, which is transmitted to the linear motion mechanism 33.

When the first pressing part 311 and the second pressing part 312 are moved to the axial first side L1 by the linear motion mechanism 33, the first frictional engagement elements 11 and the second frictional engagement elements 12 are pressed by the first pressing part 311 to bring the clutch mechanism 1 into an engaged state, and the pressing on the third frictional engagement elements 21 and the fourth frictional engagement elements 22 by the second pressing part 312 is released to bring the brake mechanism 2 into a disengaged state. In this state, the first rotary member 81 rotates with respect to the non-rotary member NR, and the first rotary member 81 and the second rotary member 82 rotate integrally with each other. Therefore, the first ring gear R1 coupled to the first rotary member 81, the first carrier C1 coupled to the drive gear DG, and the first sun gear S1 coupled to the input shaft IS and the second rotary member 82, rotate integrally with each other. As a result, the rotation of the rotor RT is transmitted as it is to the drive gear DG (see the reference sign G2 in FIG. 7).

On the other hand, when the first pressing part 311 and the second pressing part 312 are moved to the axial second side L2 by the linear motion mechanism 33, the third frictional engagement elements 21 and the fourth frictional engagement elements 22 are pressed by the second pressing part 312 to bring the brake mechanism 2 into an engaged state, and the pressing on the first frictional engagement elements 11 and the second frictional engagement elements 12 by the first pressing part 311 is released to bring the clutch mechanism 1 into a disengaged state. In this state, the relative rotation of the first rotary member 81 with respect to the non-rotary member NR is restricted, and the second rotary member 82 relatively rotates with respect to the first rotary member 81. Therefore, the first ring gear R1 coupled to the first rotary member 81, the first carrier C1 coupled to the drive gear DG, and the first sun gear S1 coupled to the input shaft IS and the second rotary member 82, relatively rotate with each other. As a result, the rotation of the rotor RT is decelerated in the planetary gear mechanism PL, which is transmitted to the drive gear DG (see the reference sign G1 in FIG. 7).

The drive gear DG is disposed between, in the axial direction L, the rotor RT and the transmission TM. In the present embodiment, the rotor RT, the drive gear DG, the planetary gear mechanism PL, and the engagement device 100 are arranged on the first axis X1 in the described order from the axial first side L1 to the axial second side L2.

The input shaft IS is formed to extend in the axial direction L. The input shaft IS is disposed to penetrate the drive gear DG in the axial direction L. The input shaft IS couples the rotor RT to the first rotary element E1 (here, the first sun gear S1) so as to rotate integrally with each other. In the present embodiment, the input shaft IS is supported to be relatively rotatable with respect to the drive gear DG via a fifth bearing B5. In the present embodiment, the input shaft IS penetrates the third side wall portion 92b of the case 9 in the axial direction L. The input shaft IS is rotatably supported with respect to the third side wall portion 92b via a sixth bearing B6. In the present embodiment, the input shaft IS penetrates the planetary gear mechanism PL in the axial direction L, and is coupled to the second rotary member 82 so as to rotate integrally therewith. The input shaft IS is supported to be relatively rotatable with respect to the first carrier C1 of the planetary gear mechanism PL via a seventh bearing B7.

The output gear OG has a larger diameter than the drive gear DG. Therefore, the rotation of the drive gear DG is decelerated between the drive gear DG and the output gear OG. In the present embodiment, the output gear OG directly meshes with the drive gear DG.

In the present embodiment, the output gear OG is disposed to overlap both the rotating electrical machine MG and the planetary gear mechanism PL as viewed in an axial direction along the axial direction L. In the example shown in FIG. 5, the output gear OG is disposed, as viewed in an axial direction along the axial direction L, so as to overlap the stator ST and the rotor RT of the rotating electrical machine MG and overlap the first sun gear S1, the first carrier C1, and the first ring gear R1 of the planetary gear mechanism PL. Here, regarding the disposing of two elements, "overlapping as viewed in a specific direction" means that when a virtual straight line parallel to the line-of-sight direction is moved in each direction orthogonal to the virtual straight line, a region, where the virtual straight line intersects both of the two elements, exists at least partially.

According to this configuration, a large reduction ratio between the drive gear DG and the output gear OG is easily ensured by increasing the diameter of the output gear OG. As a result, the rotating electrical machine MG is easily downsized.

According to the present configuration, the inter-shaft distance between the drive gear DG and the output gear OG (the distance, in the radial direction R, between the first axis X1 and the fourth axis X4) is easily reduced to a small one. Therefore, the dimension, in the radial direction R, of the vehicle driving device 1000 is easily reduced to a small one.

In the present embodiment, the drive gear DG has a smaller diameter than the first sun gear S1 of the planetary gear mechanism PL. According to this configuration, a large reduction ratio between the drive gear DG and the output gear OG is easily ensured by increasing the dimensional difference, in the radial direction R, between the drive gear DG and the output gear OG. As a result, the rotating electrical machine MG is easily downsized. In the present embodiment, the drive gear DG has a smaller diameter than the first carrier C1 of the planetary gear mechanism PL. In the present example, the drive gear DG has a smaller diameter than the revolution locus of the first pinion gear P1 supported by the first carrier C1. According to this configuration, when the first pinion gear P1 is assembled to the planetary gear mechanism PL from the drive gear DG side in the axial direction L (here, the axial first side L1), the first pinion gear P1 can be easily assembled while avoiding interference with the drive gear DG.

The pair of output members OM are arranged side by side in the axial direction L. The output member OM on the axial first side L1 is coupled to the wheel W on the axial first side L1 so as to rotate integrally therewith, via a first drive shaft DS1 (see FIG. 6) extending in the axial direction L. The output member OM on the axial second side L2 is coupled to the wheel W on the axial second side L2 so as to rotate integrally therewith via a second drive shaft DS2 (see FIG. 6) extending in the axial direction L. In the following description, the output member OM on the axial first side L1 is defined as a "first output member OM1", and the output member OM on the axial second side L2 is defined as a "second output member OM2".

The differential gear mechanism DF is a differential gear mechanism of a planetary gear type including a second sun gear S2, a second carrier C2, and a second ring gear R2. In the present embodiment, the differential gear mechanism DF is a planetary gear mechanism of a double pinion type. Therefore, in the present embodiment, the second carrier C2 rotatably supports an inner pinion gear P21 that meshes with the second sun gear S2 and an outer pinion gear P22 that meshes with the second ring gear R2.

The second sun gear S2 is coupled to the first output member OM1 so as to rotate integrally therewith. In the present embodiment, the first output member OM1 is disposed to extend from the second sun gear S2 to the axial first side L1. The first output member OM1 is supported to be relatively rotatable with respect to the second carrier C2 via an eighth bearing B8. In the present embodiment, the first output member OM1 is disposed to penetrate, in the axial direction L, the third side wall portion 92b and the second side wall portion 92a of the case 9. The first output member OM1 is rotatably supported with respect to the third side wall portion 92b via a ninth bearing B9, and is rotatably supported with respect to the second side wall portion 92a via a tenth bearing B10.

The second carrier C2 is coupled to the second output member OM2 so as to rotate integrally therewith. In the present embodiment, the second output member OM2 is disposed to extend from the second carrier C2 to the axial second side L2. The second output member OM2 is supported to be relatively rotatable with respect to the second ring gear R2 via an eleventh bearing B11. In the present embodiment, the second output member OM2 is disposed to penetrate the fourth side wall portion 92d of the case 9 in the axial direction L. The second output member OM2 is rotatably supported with respect to the fourth side wall portion 92d via a twelfth bearing B12.

The second ring gear R2 is coupled to the output gear OG so as to rotate integrally therewith. In the present embodiment, the second ring gear R2 is disposed on the inner side, in the radial direction R, with respect to the output gear OG. Furthermore, the second ring gear R2 is disposed to overlap the output gear OG as viewed in a radial direction along the radial direction R.

Figure 7:
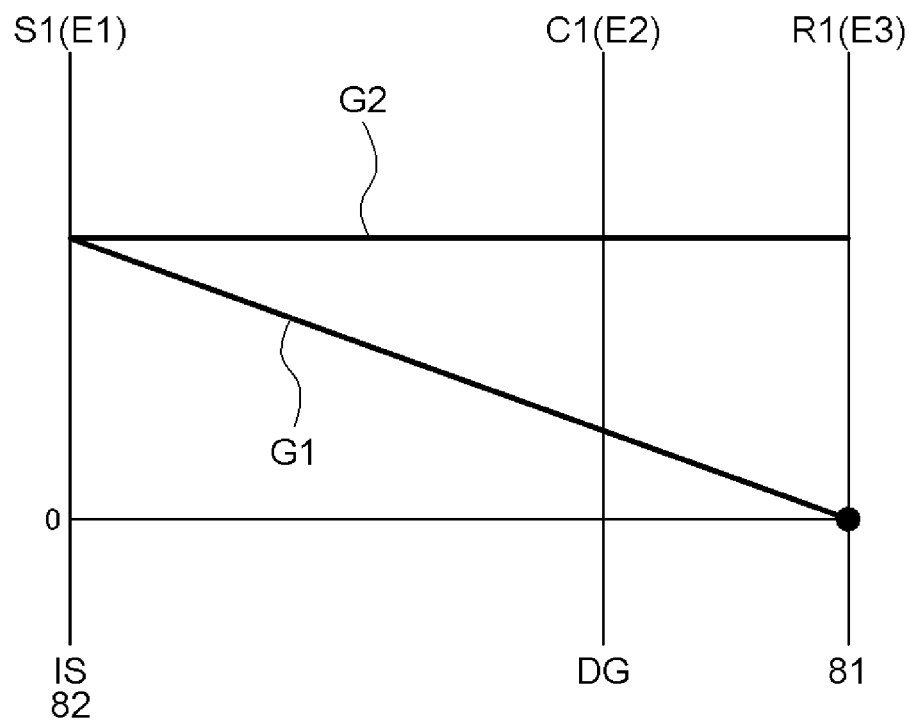
FIG. 7 is a speed diagram of a planetary gear mechanism of the vehicle driving device according to the first embodiment.

FIG. 7 shows a speed diagram of the planetary gear mechanism PL according to the present embodiment. In the speed diagram of FIG. 7, the vertical lines correspond to the rotational speeds of the respective rotary elements of the planetary gear mechanism PL. Each of the plurality of the vertical lines arranged in parallel corresponds to each rotary element of the planetary gear mechanism PL. In the speed diagram of FIG. 7, the reference signs denoted above the plurality of the vertical lines are reference signs of the corresponding rotary elements of the planetary gear mechanism PL. The reference signs denoted below the plurality of vertical lines are reference signs of elements that rotate integrally with the rotary elements corresponding to the reference signs denoted above. In the speed diagram of FIG. 7, the black circle on the vertical line corresponding to the third rotary element E3 indicates that the brake mechanism 2 is in a direct engaged state. The "direct engaged state" means an engaged state where there is no rotational speed difference between the input element and the output element of a frictional engagement device.

When the brake mechanism 2 is brought into an engaged state and the clutch mechanism 1 is brought into a disengaged state, a state is created in which a first shift speed G1 is formed in the transmission TM. In this state, the first ring gear R1 coupled to the first rotary member 81, the first carrier C1 coupled to the drive gear DG, and the first sun gear S1 coupled to the input shaft IS and the second rotary member 82, relatively rotate with each other, as shown in FIG. 7. As a result, the rotation of the rotor RT is decelerated at a gear ratio corresponding to the first shift speed G1 in the planetary gear mechanism PL, which is transmitted to the drive gear DG.

On the other hand, when the clutch mechanism 1 is brought into an engaged state and the brake mechanism 2 is brought into a disengaged state, a state is created in which a second shift speed G2 is formed in the transmission TM. In this state, the first ring gear R1 coupled to the first rotary member 81, the first carrier C1 coupled to the drive gear DG, and the first sun gear S1 coupled to the input shaft IS and the second rotary member 82, rotate integrally with each other. As a result, the gear ratio corresponding to the second shift speed G2 becomes 1, and thus the rotation of the rotor RT is transmitted as it is to the drive gear DG.

4. Vehicle Driving Device According to Second Embodiment

Figure 8:
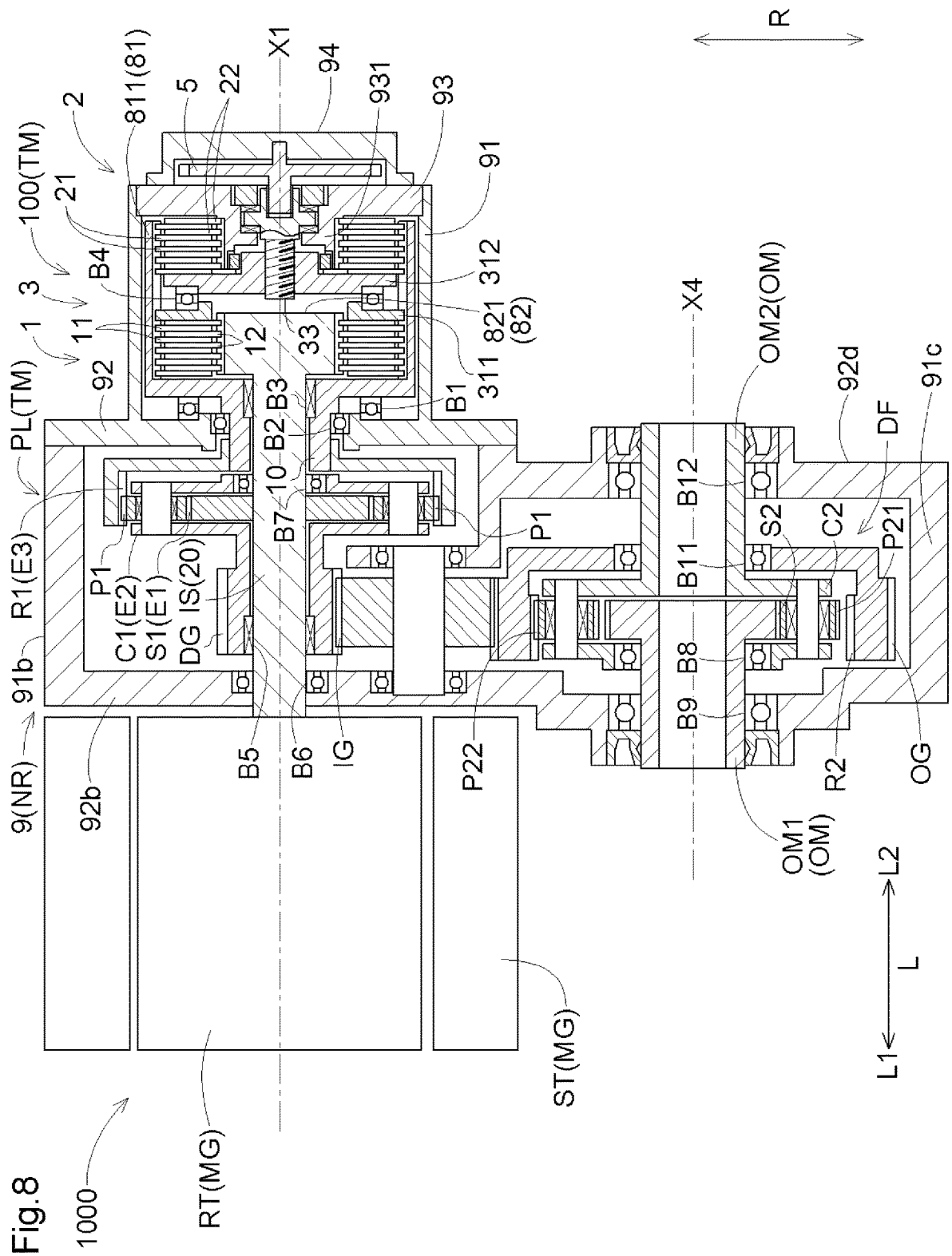
FIG. 8 is a cross-sectional diagram taken along an axial direction of a vehicle driving device according to the second embodiment.
Figure 9:
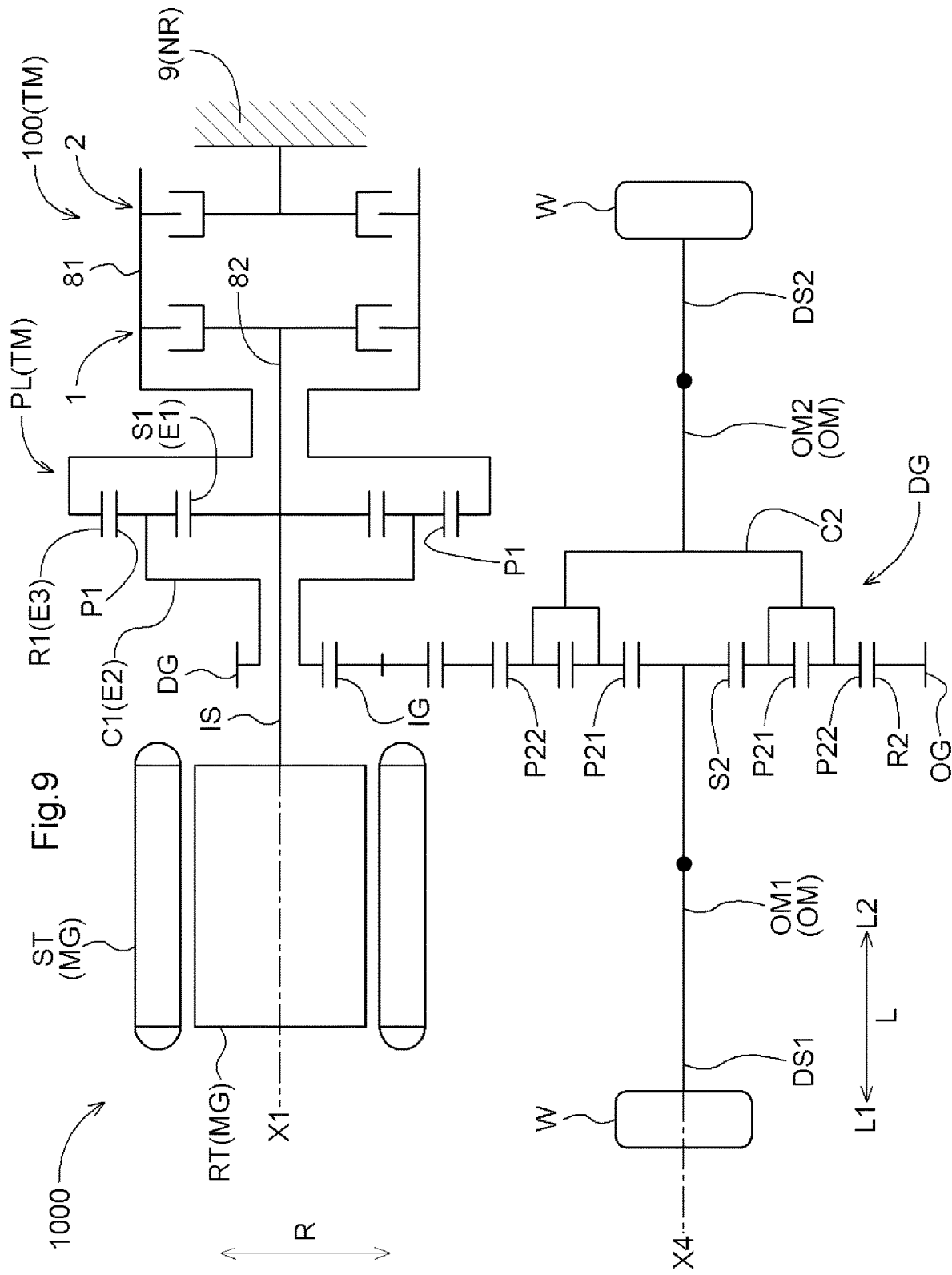
FIG. 9 is a skeleton diagram of the vehicle driving device according to the second embodiment.

Hereinafter, a vehicle driving device 1000 according to the second embodiment will be described with reference to FIGS. 8 and 9. The vehicle driving device 1000 according to the present embodiment is different from the vehicle driving device 1000 according to the first embodiment in that an output gear OG does not directly mesh with a drive gear DG but meshes with an idler gear IG that meshes with the drive gear DG. Hereinafter, differences from the vehicle driving device 1000 according to the first embodiment will be mainly described. Note that points that are not particularly described are the same as those of the vehicle driving device 1000 according to the first embodiment.

In the present embodiment, the output gear OG meshes with the idler gear IG that meshes with the drive gear DG, as described above and as shown in FIGS. 8 and 9. That is, the output gear OG and the drive gear DG mesh with the idler gear IG at positions different from each other in the circumferential direction of the idler gear IG.

In the present embodiment, the output gear OG overlaps a rotating electrical machine MG as viewed in an axial direction along the axial direction L, but does not overlap a planetary gear mechanism PL.

In the present embodiment, a case 9 does not include a second peripheral wall portion 91a and a second side wall portion 92a. Accordingly, in the present embodiment, a tenth bearing B10, that rotatably supports a first output member OM1 with respect to the second side wall portion 92a, is not provided. The first output member OM1 has a shorter dimension in the axial direction L than in the first embodiment.

In the present embodiment, a third side wall portion 92b is formed integrally with a third peripheral wall portion 91b and a fourth peripheral wall portion 91c. A first side wall portion 92 is formed of a member different from the third peripheral wall portion 91b.

As described above, the vehicle driving device 1000 includes:
  a rotating electrical machine MG including a rotor RT;
  an input shaft IS that rotates integrally with the rotor RT;
  an output gear OG that is drive-coupled to a wheel W; and
  a transmission TM including a planetary gear mechanism PL and an engagement device 100, in which
  the planetary gear mechanism PL includes a first rotary element E1, a second rotary element E2, and a third rotary element E3, and is configured such that the order of the rotational speeds of the first rotary element E1, the second rotary element E2, and the third rotary element E3 becomes the described order,
  the first rotary element E1 is coupled to the input shaft IS so as to rotate integrally with the input shaft IS,
  the second rotary element E2 is coupled to the drive gear DG so as to rotate integrally with the drive gear DG,
  the third rotary element E3 is switched, in accordance with the state of engagement of the engagement device 100, between a first state where the third rotary element E3 is coupled to the non-rotary member NR and a second state where the third rotary element E3 is coupled to the first rotary element E1 or the second rotary element E2 so as to rotate integrally with the first rotary element E1 or the second rotary element E2,
  the rotor RT, the planetary gear mechanism PL, the engagement device 100, and the drive gear DG are coaxially disposed,
  the drive gear DG is disposed between, in the axial direction L, the rotor RT and the transmission TM,
  the input shaft IS penetrates the drive gear DG in the axial direction L, and couples the rotor RT to the first rotary element E1 so as to rotate integrally with each other,
  the output gear OG has a larger diameter than the drive gear DG, and
  the drive gear DG meshes with the output gear OG, or an idler gear IG, that meshes with the drive gear DG, meshes with the output gear OG.

According to this configuration, the drive gear DG, coupled to the second rotary element E2 of the planetary gear mechanism PL so as to rotate integrally therewith, meshes with the output gear OG formed to have a larger diameter than the drive gear DG directly or via the idler gear IG. As a result, the rotation of the second rotary element E2 transmitted to the drive gear DG can be decelerated between the drive gear DG and the output gear OG. Therefore, the configuration of the vehicle driving device 1000 can be simplified as compared with, for example, a configuration including the planetary gear mechanism PL that decelerates the rotation of the second rotary element E2. In addition, in the configuration not including the idler gear IG, meshing between gears in the power transmission path from the rotating electrical machine MG to the output gear OG is only at one position where the drive gear DG meshes with the output gear OG, when the third rotary element E3 is in the second state. On the other hand, when the third rotary element E3 is in the first state, only the meshing in the planetary gear mechanism PL increases in number. As described above, the number of meshing between gears in the entire vehicle driving device 1000 is small, and thus the transmission efficiency through the power transmission path from the rotating electrical machine MG to the output gear OG is easily enhanced. In addition, even in the configuration including the idler gear IG, the number of meshing between gears is increased by only one as compared with a configuration not including the idler gear IG, and thus the transmission efficiency through the power transmission path from the rotating electrical machine MG to the output gear OG is similarly easily enhanced.

According to this configuration, the rotor RT, the transmission TM, and the drive gear DG are coaxially disposed, and the drive gear DG is disposed between, in the axial direction L, the rotor RT and the transmission TM. As a result, the dimension, in the radial direction R, of the vehicle driving device 1000 can be reduced to a smaller one than in a configuration in which the drive gear DG is disposed to overlap at least one of the rotor RT and the transmission TM as viewed in a radial direction along the radial direction R. Furthermore, a large reduction ratio between the drive gear DG and the output gear OG is easily ensured by increasing the dimensional difference between, in the radial direction R, the drive gear DG and the output gear OG. As a result, the rotating electrical machine MG is easily downsized.

According to the present configuration, the vehicle driving device 1000 having a small size and a simple configuration can be realized in the configuration including the transmission TM including the planetary gear mechanism PL and the engagement device 100, as described above.

In the first and second embodiments, the vehicle driving device 1000 further includes an output member OM that rotates integrally with the wheel W, in which the output gear OG is disposed coaxially with the output member OM.

According to this configuration, the output gear OG, that meshes with the drive gear DG disposed coaxially with the rotor RT and the transmission TM directly or via the idler gear IG, is disposed coaxially with the output member OM that rotates integrally with the wheel W. As a result, the number of shafts in the entire vehicle driving device 1000 is easily reduced to a small one. Therefore, the dimension, in the radial direction R, of the vehicle driving device 1000 can be reduced to a small one.

In the first and second embodiments, the vehicle driving device 1000 further includes:
- a pair of output members OM, each of which rotates integrally with the wheels W different from the other wheels W; and
- a differential gear mechanism DF of a planetary gear type that includes a second sun gear S2, a second carrier C2, and a second ring gear R2 and distributes the rotation of the output gear OG to the pair of output members OM, in which
- the output gear OG is disposed at a position that is on the outer side, in the radial direction R, from the ring gear and that overlaps the ring gear as viewed in a radial direction along the radial direction R.

According to this configuration, the differential gear mechanism DF is of a planetary gear type, and thus the dimension, in the axial direction L, of the vehicle driving device 1000 is easily reduced to a smaller one than in a configuration in which the differential gear mechanism DF is of a bevel gear type.

In addition, according to the present configuration, the output gear OG is disposed on the outer side, in the radial direction R, from the second ring gear R2. As a result, a large reduction ratio between the drive gear DG and the output gear OG is easily ensured by increasing the diameter of the output gear OG. As a result, the rotating electrical machine MG is easily downsized.

According to the present configuration, the output gear OG is disposed to overlap the second ring gear R2 as viewed in a radial direction along the radial direction R. As a result, the dimension, in the axial direction L, of the vehicle driving device 1000 can be reduced to a smaller one than in a configuration in which the output gear OG is disposed to be shifted, in the axial direction L, with respect to the second ring gear R2.

In the first and second embodiments, the planetary gear mechanism PL is disposed on the rotor RT side, in the axial direction L, with respect to the engagement device 100.

According to this configuration, the coupling structure between the first rotary element E1 of the planetary gear mechanism PL and the rotor RT, and the coupling structure between the second rotary element E2 of the planetary gear mechanism PL and the drive gear DG, are easily simplified. Therefore, the vehicle driving device 1000 is easily downsized.

5. Vehicle Driving Device According to Third Embodiment

Figure 10:
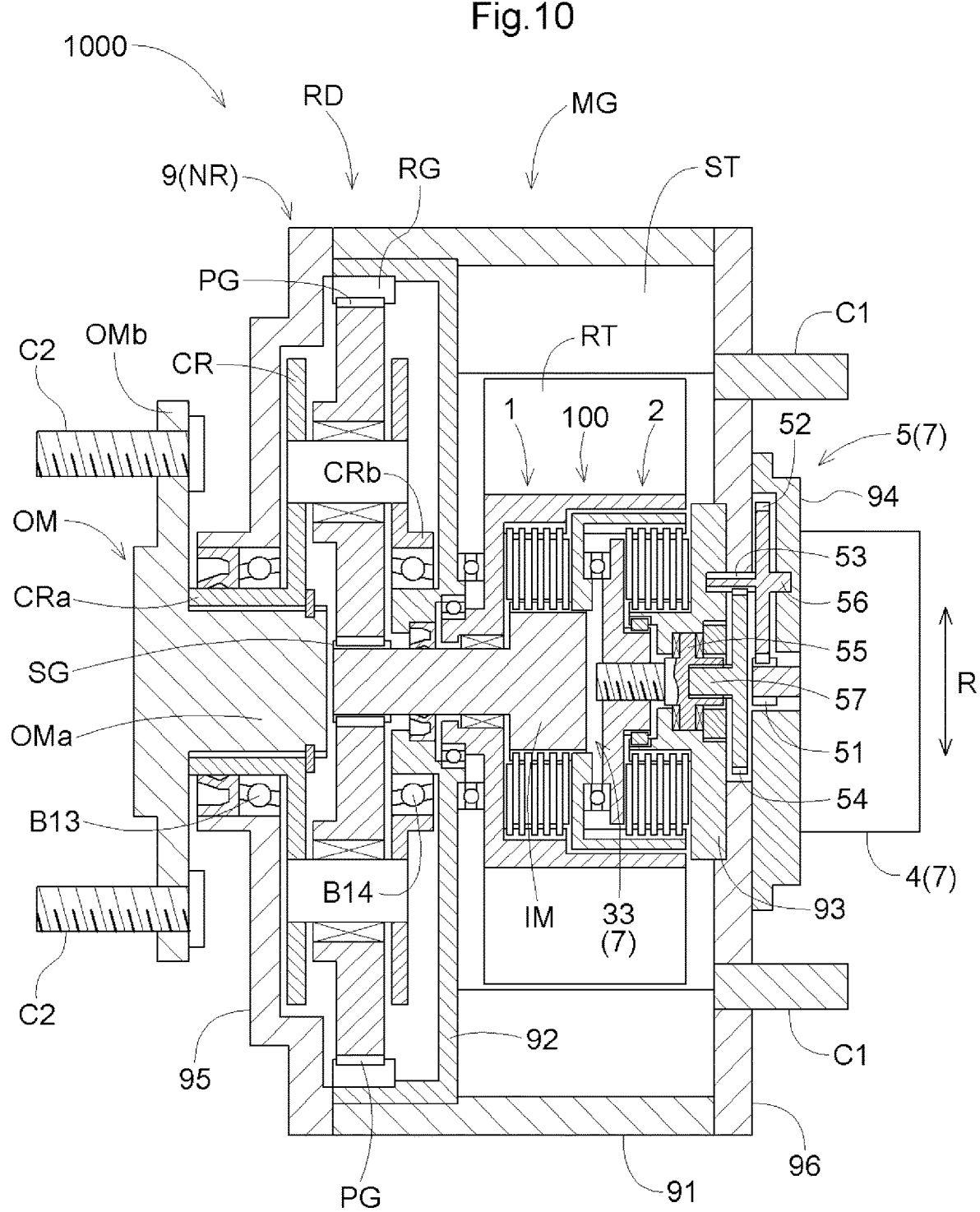
FIG. 10 is a cross-sectional diagram taken along an axial direction of a vehicle driving device according to a third embodiment.
Figure 11:
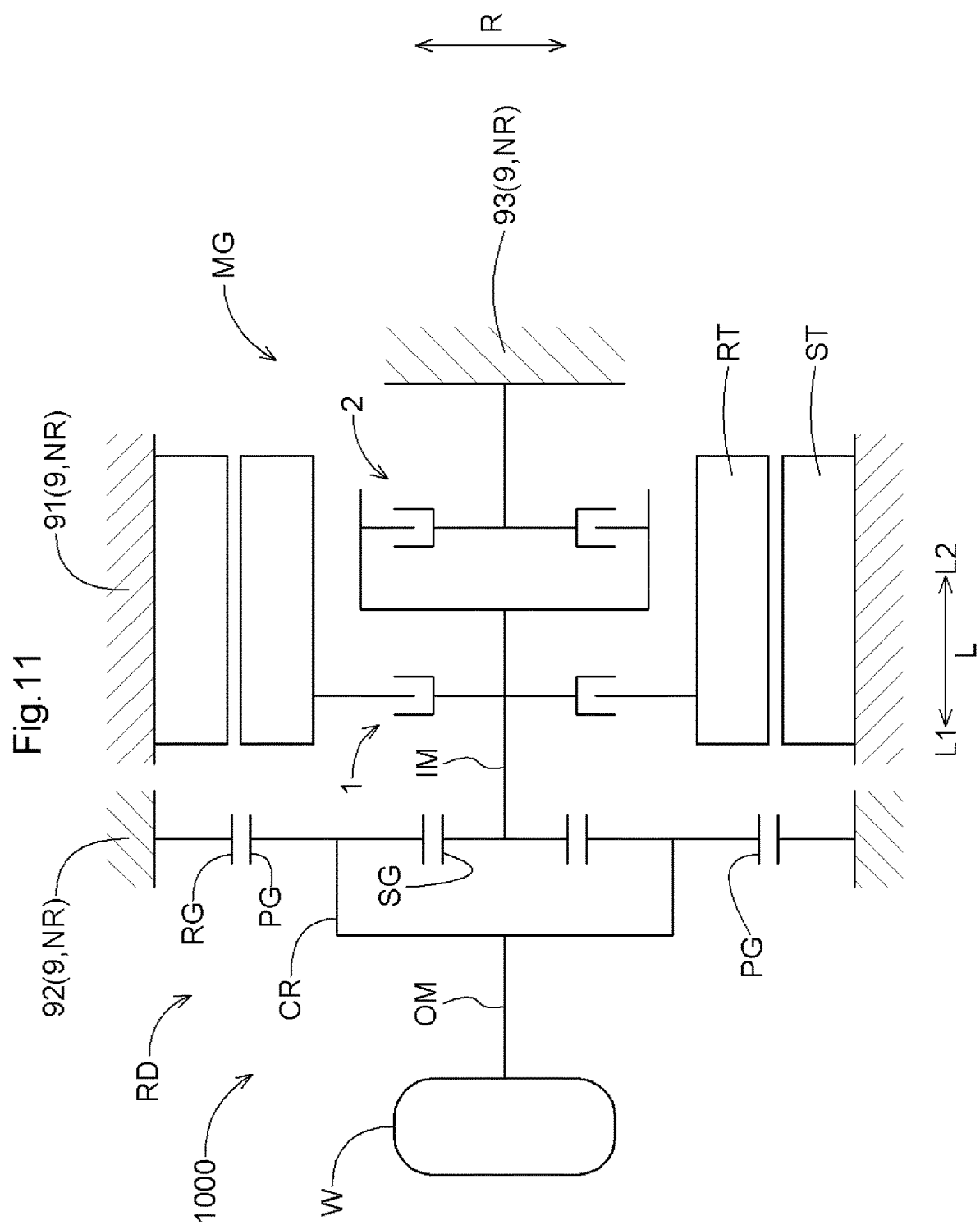
FIG. 11 is a skeleton diagram of the vehicle driving device according to the third embodiment.

Hereinafter, a vehicle driving device 1000 according to a third embodiment including the engagement device 100 according to the second embodiment will be described with reference to FIGS. 10 to 12. As shown in FIGS. 10 and 11, the vehicle driving device 1000 includes a rotating electrical machine MG including a stator ST and a rotor RT, an input member IM to which the rotation of the rotor RT is transmitted, an output member OM that rotates integrally with a wheel W (see FIG. 11), a reduction device RD that decelerates the rotation of the input member IM and transmits the rotation to the output member OM, and a brake mechanism 2 that selectively engages the input member IM with a non-rotary member NR. In the present embodiment, the vehicle driving device 1000 further includes a clutch mechanism 1 that selectively engages the rotor RT with the input member IM, a driving mechanism 7 that changes the states of engagement of both the brake mechanism 2 and the clutch mechanism 1, and a case 9 as the non-rotary member NR. In the present embodiment, the vehicle driving device 1000 is configured as a driving device for the wheel W, which is referred to as an in-wheel motor.

The rotor RT, the input member IM, the output member OM, and the brake mechanism 2 are coaxially disposed. In other words, the rotor RT, the input member IM, and the brake mechanism 2 are disposed coaxially with the output member OM that rotates integrally with the wheel W, that is, coaxially with the axis of rotation of the wheel W. In the present embodiment, the reduction device RD and the clutch mechanism 1 are also disposed coaxially with them.

As shown in FIG. 10, the case 9 houses the rotating electrical machine MG, the input member IM, the output member OM, the reduction device RD, the brake mechanism 2, the clutch mechanism 1, and the driving mechanism 7. In the present embodiment, the case 9 houses the output member OM and the driving mechanism 7 with parts thereof exposed to the outer side. In the present embodiment, the case 9 further includes, in addition to the first peripheral wall portion 91, the first side wall portion 92, the support wall portion 93, and the cover portion 94, a fifth side wall portion 95 and a sixth side wall portion 96.

The first peripheral wall portion 91 is formed in a tubular shape whose axial first side L1 and axial second side L2 are opened. The fifth side wall portion 95 and the sixth side wall portion 96 are formed to extend along the radial direction R. The fifth side wall portion 95 is disposed to close the opening, on the axial first side L1, of the first peripheral wall portion 91. The sixth side wall portion 96 is disposed to close the opening, on the axial second side L2, of the first peripheral wall portion 91.

The first side wall portion 92 is formed to extend to the inner side, in the radial direction R, from the first peripheral wall portion 91. The first side wall portion 92 is disposed between, in the axial direction L, the fifth side wall portion 95 and the sixth side wall portion 96. In the present embodiment, the reduction device RD is disposed between, in the axial direction L, the first side wall portion 92 and the fifth side wall portion 95. The rotating electrical machine MG, the brake mechanism 2, and the clutch mechanism 1 are disposed between, in the axial direction L, the first side wall portion 92 and the sixth side wall portion 96.

The cover portion 94 is formed to cover the axial second side L2 of the sixth side wall portion 96. In the present embodiment, a plurality of vehicle body coupling members C1 for coupling the vehicle driving device 1000 to the vehicle body are disposed to protrude from the sixth side wall portion 96 to the axial second side L2 in a distributed manner in a circumferential direction around the axis of rotation of the rotor RT. The cover portion 94 is disposed on the inner side, in the radial direction R, with respect to the plurality of vehicle body coupling members C1.

The rotating electrical machine MG functions as a driving force source for the wheel W (see FIG. 11). The rotating electrical machine MG has a function as a motor (electric motor) that receives supply of electric power and generates power, and a function as a generator (generation device) that receives supply of power and generates electric power. Specifically, the rotating electrical machine MG is electrically connected to a power storage device (not shown) such as a battery or a capacitor. The rotating electrical machine MG is powered by the electric power stored in the power storage device, and generates a driving force. In addition, the rotating electrical machine MG generates power by the driving force transmitted from the wheel W side to charge the power storage device.

The stator ST of the rotating electrical machine MG is fixed to the non-rotary member NR. In the present embodiment, the stator ST is fixed to the first peripheral wall portion 91 of the case 9. The rotor RT of the rotating electrical machine MG is rotatably supported with respect to the stator ST. In the present embodiment, the rotor RT is disposed on the inner side, in the radial direction R, with respect to the stator ST.

Figure 12:
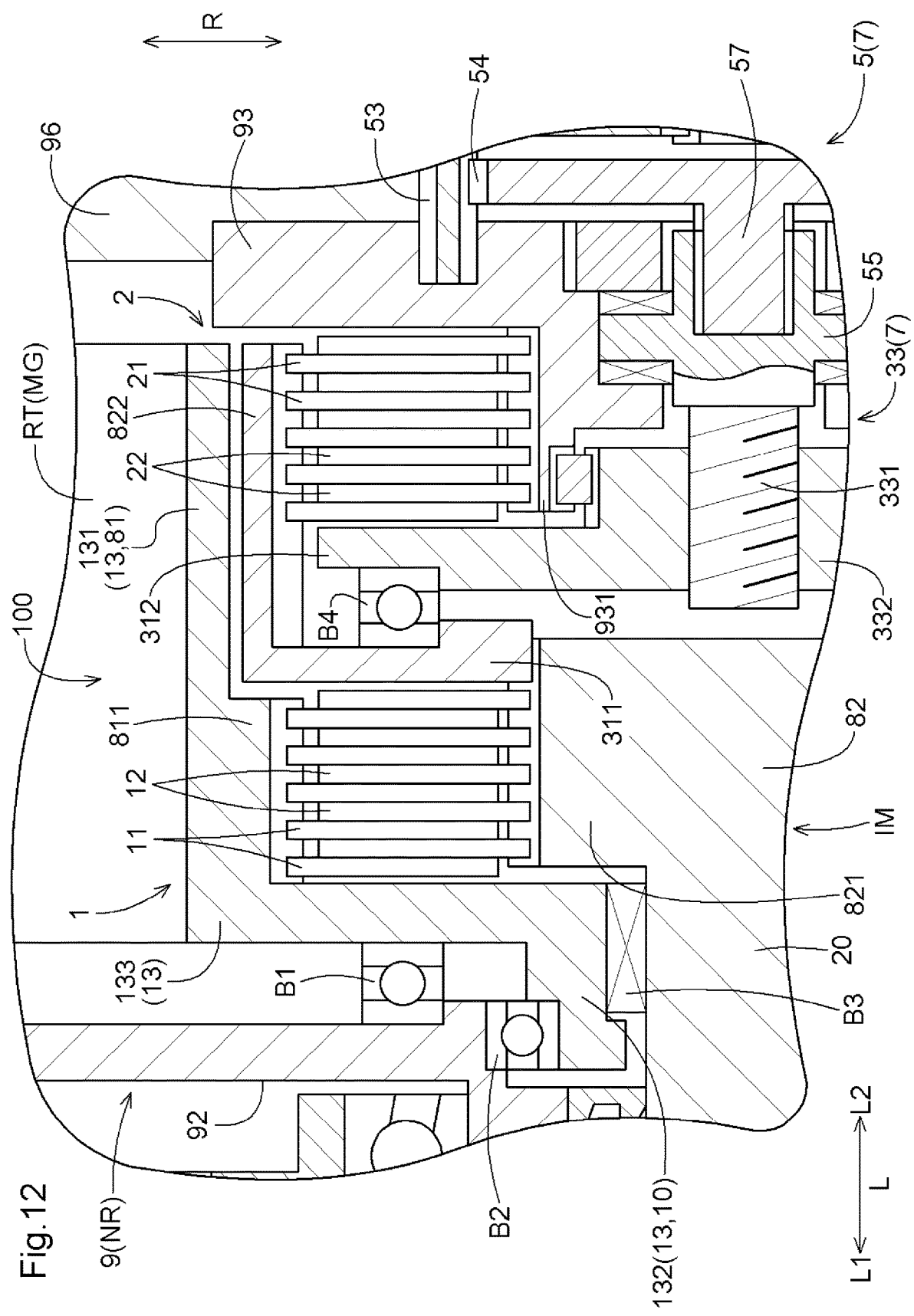
FIG. 12 is a partially enlarged cross-sectional diagram taken along an axial direction of a dual-use driving device according to the third embodiment.

In the present embodiment, the rotating electrical machine MG further includes a rotor support member 13, as shown in FIG. 12. The rotor support member 13 is a member that rotatably supports the rotor RT with respect to the case 9. In the present embodiment, the rotor support member 13 includes an outer tubular part 131, an inner tubular part 132, and a connection part 133.

The outer tubular part 131 is formed in a tubular shape whose axis is the same as the rotor RT. The outer tubular part 131 is disposed to support the rotor RT from the inner side in the radial direction R. In the present embodiment, the outer tubular part 131 corresponds to the first rotary member 81.

The inner tubular part 132 is formed in a tubular shape whose axis is the same as the outer tubular part 131. The inner tubular part 132 is formed to have a smaller diameter than the outer tubular part 131. In the present embodiment, the inner tubular part 132 is rotatably supported with respect to the first side wall portion 92 of the case 9 via a second bearing B2. The second bearing B2 is a radial bearing disposed between, in the radial direction R, the inner tubular part 132 and the first side wall portion 92. In the shown example, the second bearing B2 is a ball bearing disposed to support the inner tubular part 132 from the outer side in the radial direction R. In the present embodiment, the inner tubular part 132 corresponds to the first shaft member 10.

The connection part 133 extends along the radial direction R so as to connect the outer tubular part 131 to the inner tubular part 132. In the present embodiment, the outer end portion, in the radial direction R, of the connection part 133 is coupled to the end portion on the axial first side L1 of the outer tubular part 131. The inner end portion, in the radial direction R, of the connection part 133 is coupled to the end portion, in the axial second side L2, of the inner tubular part 132. In the shown example, the outer tubular part 131, the inner tubular part 132, and the connection part 133 are integrally formed.

In the present embodiment, the connection part 133 is rotatably supported with respect to the first side wall portion 92 of the case 9 via a first bearing B1. The first bearing B1 is a thrust bearing disposed between, in the axial direction L, the connection part 133 and the first side wall portion 92. In the shown example, the first bearing B1 is a ball bearing disposed to support the connection part 133 from the axial first side L1.

In the present embodiment, the input member IM includes a second rotary member 82 and a second shaft member 20. The second shaft member 20 is disposed to penetrate the first side wall portion 92 of the case 9 in the axial direction L. In the present embodiment, the second shaft member 20 is disposed on the inner side, in the radial direction R, with respect to the inner tubular part 132 of the rotor support member 13. The second shaft member 20 is supported to be relatively rotatable with respect to the inner tubular part 132 via a third bearing B3. The third bearing B3 is a radial bearing disposed between, in the radial direction R, the second shaft member 20 and the inner tubular part 132.

In the present embodiment, the brake mechanism 2 and the clutch mechanism 1 are arranged side by side in the axial direction L. In the shown example, the clutch mechanism 1 is disposed on the axial first side L1 with respect to the brake mechanism 2.

In the present embodiment, the brake mechanism 2 includes a third frictional engagement element 21, a fourth frictional engagement element 22, a second outer support part 822, a second inner support part 931, and a second pressing part 312, as shown in FIG. 12.

The third frictional engagement element 21 and the fourth frictional engagement element 22 are disposed to face each other in the axial direction L. The third frictional engagement element 21 and the fourth frictional engagement element 22 are frictionally engaged with each other by being pressed in the axial direction L. In the present embodiment, each of the third frictional engagement element 21 and the fourth frictional engagement element 22 is formed in a disk shape whose axis is the same as the rotor RT. A plurality of the third frictional engagement elements 21 and a plurality of the fourth frictional engagement elements 22 are provided, which are alternately disposed along the axial direction L. Either of the third frictional engagement elements 21 and the fourth frictional engagement elements 22 may be defined as friction plates, and the other may be defined as separate plates.

The second outer support part 822 slidably supports, in the axial direction L, the third frictional engagement elements 21 so as to rotate integrally with the third frictional engagement elements 21. In the present embodiment, the second outer support part 822 is formed in a tubular shape whose axis is the same as the rotor RT. The second outer support part 822 supports the third frictional engagement elements 21 from the outer side in the radial direction R. In the present example, a plurality of spline teeth extending in the axial direction L are formed on the inner peripheral portion of the second outer support part 822 in a distributed manner in the circumferential direction. On the other hand, similar spline teeth are also formed on the outer peripheral portions of the third frictional engagement elements 21 in a distributed manner in the circumferential direction. These spline teeth are engaged with each other.

The second inner support part 931 slidably supports, in the axial direction L, the fourth frictional engagement elements 22 so as to rotate integrally with the fourth frictional engagement elements 22. In the present embodiment, the second inner support part 931 is formed in a cylindrical shape whose axis is the same as the second outer support part 822 and whose diameter is smaller than the second outer support part 822. The second inner support part 931 supports the fourth frictional engagement elements 22 from the inner side in the radial direction R. In the present example, a plurality of spline teeth extending in the axial direction L are formed on the outer peripheral portion of the second inner support part 931 in a distributed manner in the circumferential direction. On the other hand, similar spline teeth are also formed on the inner peripheral portions of the fourth frictional engagement elements 22 in a distributed manner in the circumferential direction. These spline teeth are engaged with each other.

The second outer support part 822 is coupled to the input member IM so as to rotate integrally therewith. The second inner support part 931 is fixed to the non-rotary member NR. In the present embodiment, the second inner support part 931 is fixed to the support wall portion 93 included in the case 9 as the non-rotary member NR. The support wall portion 93 is formed to extend along the radial direction R. In the present embodiment, the support wall portion 93 is joined, from the axial first side L1, to a portion, covered by the cover portion 94, of the sixth side wall portion 96. In the shown example, the second inner support part 931 is formed integrally with the support wall portion 93 so as to protrude from the support wall portion 93 to the axial first side L1.

The second pressing part 312 is configured to press the third frictional engagement elements 21 and the fourth frictional engagement elements 22. In the present embodiment, the second pressing part 312 is formed to extend along the radial direction R. The second pressing part 312 is disposed to press the third frictional engagement elements 21 and the fourth frictional engagement elements 22 from the axial first side L1.

In the present embodiment, the clutch mechanism 1 includes a first frictional engagement element 11, a second frictional engagement element 12, a first outer support part 811, a first inner support part 821, and a first pressing part 311.

The first frictional engagement element 11 and the second frictional engagement element 12 are disposed to face each other in the axial direction L. The first frictional engagement element 11 and the second frictional engagement element 12 are frictionally engaged with each other by being pressed in the axial direction L. In the present embodiment, each of the first frictional engagement element 11 and the second frictional engagement element 12 is formed in a disk shape whose axis is the same as the rotor RT. A plurality of the first frictional engagement elements 11 and a plurality of the second frictional engagement elements 12 are provided, which are alternately disposed along the axial direction L. Either of the first frictional engagement elements 11 and the second frictional engagement elements 12 may be defined as friction plates, and the other may be defined as separate plates.

The first outer support part 811 slidably supports, in the axial direction L, the first frictional engagement elements 11 so as to rotate integrally with the first frictional engagement elements 11. In the present embodiment, the first outer support part 811 is formed in a tubular shape whose axis is the same as the rotor RT. The first outer support part 811 supports the first frictional engagement elements 11 from the outer side in the radial direction R. In the present example, a plurality of spline teeth extending in the axial direction L are formed on the inner peripheral portion of the first outer support part 811 in a distributed manner in the circumferential direction. On the other hand, similar spline teeth are also formed on the outer peripheral portions of the first frictional engagement elements 11 in a distributed manner in the circumferential direction. These spline teeth are engaged with each other.

The first inner support part 821 slidably supports, in the axial direction L, the second frictional engagement elements 12 so as to rotate integrally with the second frictional engagement elements 12. In the present embodiment, the first inner support part 821 is formed in a tubular shape whose axis is the same as the first outer support part 811 and whose diameter is smaller than the first outer support part 811. The first inner support part 821 supports the second frictional engagement elements 12 from the inner side in the radial direction R. In the present example, a plurality of spline teeth extending in the axial direction L are formed on the outer peripheral portion of the first inner support part 821 in a distributed manner in the circumferential direction. On the other hand, similar spline teeth are also formed on the inner peripheral portions of the second frictional engagement elements 12 in a distributed manner in the circumferential direction. These spline teeth are engaged with each other.

The first pressing part 311 is configured to press the first frictional engagement elements 11 and the second frictional engagement elements 12. In the present embodiment, the first pressing part 311 is formed to extend along the radial direction R. The first pressing part 311 is disposed to press the first frictional engagement elements 11 and the second frictional engagement elements 12 from the axial second side L2. In the present embodiment, the first pressing part 311 is coupled to the second outer support part 822 of the brake mechanism 2 so as to rotate integrally therewith. In the shown example, the first pressing part 311 and the second outer support part 822 are integrally formed such that the outer end portion, in the radial direction R, of the first pressing part 311 and the end portion, on the axial first side L1, of the second outer support part 822 are coupled to each other.

In the present embodiment, the first pressing part 311 is supported to be relatively rotatable with respect to the second pressing part 312 via a fourth bearing B4. The fourth bearing B4 is a thrust bearing disposed between, in the axial direction L, the first pressing part 311 and the second pressing part 312. In the shown example, the fourth bearing B4 is a ball bearing disposed to support the first pressing part 311 from the axial second side L2 and to support the second pressing part 312 from the axial first side L1.

The first outer support part 811 is coupled to the rotor RT so as to rotate integrally therewith. In the present embodiment, the first outer support part 811 is coupled, from the inner side in the radial direction R, to the outer tubular part 131 of the rotor support member 13. In the shown example, the first outer support part 811 is formed integrally with the outer tubular part 131.

The first inner support part 821 is coupled to the input member IM so as to rotate integrally therewith. In the present embodiment, the first inner support part 821 is coupled, from the outer side in the radial direction R, to a portion (here, the second rotary member 82), located on the axial second side L2 from the connection part 133 of the rotor support member 13, of the input member IM. In the shown example, the first inner support part 821 is formed integrally with the input member IM.

The first inner support part 821 is coupled to the second outer support part 822 of the brake mechanism 2 so as to rotate integrally therewith. In the present embodiment, the first inner support part 821 slidably supports, in the axial direction L, the first pressing part 311 coupled to the second outer support part 822 so as to rotate integrally with the first pressing part 311. In the present example, spline teeth, that are engaged with the spline teeth formed on the outer peripheral portion of the first inner support part 821, are formed on the inner peripheral portion of the first pressing part 311 in a distributed manner in the circumferential direction. These spline teeth are engaged with each other. In this way, the third frictional engagement elements 21 of the brake mechanism 2 and the second frictional engagement elements 12 of the clutch mechanism 1 rotate integrally with each other.

The brake mechanism 2 is disposed at a position that is on the inner side, in the radial direction R, with respect to the rotor RT of the rotating electrical machine MG and that overlaps the rotor RT as viewed in a radial direction along the radial direction R. Here, regarding the disposing of two elements, "overlapping as viewed in a specific direction" means that when a virtual straight line parallel to the line-of-sight direction is moved in each direction orthogonal to the virtual straight line, a region, where the virtual straight line intersects both of the two elements, exists at least partially.

In the present embodiment, the clutch mechanism 1 is also disposed at a position that is on the inner side, in the radial direction R, with respect to the rotor RT and that overlaps the rotor RT as viewed in a radial direction along the radial direction R.

As described above, the reduction device RD, that decelerates the rotation of the input member IM and transmits the rotation to the output member OM, is provided, and thus the moment of inertia of the rotor RT is amplified in accordance with the reduction ratio of the reduction device RD, which acts on the output member OM. As a result, for example, when a large torque fluctuation is transmitted from the wheel W to the output member OM due to the wheel W riding over a step, traveling on a wavy road, or the like, the torque to act on a driving force transmission path tends to be excessive. Meanwhile, if members of high strength, that will be disposed on the driving force transmission path, are adopted, the sizes of the members are increased.

According to the present configuration, the clutch mechanism 1 that selectively engages the rotor RT with the input member IM is provided. As a result, when excessive torque acts on the driving force transmission path, the clutch mechanism 1 slips, so that the driving force to be transmitted between the rotor RT and the input member IM can be prevented from becoming excessive. Therefore, the members to be disposed on the driving force transmission path can be downsized.

In addition, according to the present configuration, the rotor RT can be separated from the input member IM (eventually the wheel W) by bringing the clutch mechanism 1 into a disengaged state. As a result, the rotating electrical machine MG can be stopped while the vehicle is traveling with inertia, while the vehicle is traveling by a driving force from another driving source, or the like. Therefore, the energy efficiency of the vehicle driving device 1000 can be enhanced.

The driving mechanism 7 is configured to change its state between a first state where the brake mechanism 2 is brought into an engaged state and the clutch mechanism 1 is brought into a disengaged state and a second state where the brake mechanism 2 is brought into a disengaged state and the clutch mechanism 1 is brought into an engaged state. In the present embodiment, the driving mechanism 7 is configured to change its state to a third state where the brake mechanism 2 is brought into a disengaged state and the clutch mechanism 1 is brought into a disengaged state. In the third state, the rotating electrical machine MG can be stopped while the vehicle is traveling with inertia, while the vehicle is traveling by a driving force from another driving source, or the like, as described above. In the present embodiment, the driving mechanism 7 includes a linear motion mechanism 33, a transmission mechanism 5, and a driving source 4, as shown in FIG. 10.

The linear motion mechanism 33 is configured to move the second pressing part 312 of the brake mechanism 2 and the first pressing part 311 of the clutch mechanism 1 in the axial direction L. In the present embodiment, the second pressing part 312 and the first pressing part 311 are disposed between, in the axial direction L, the third frictional engagement elements 21 and the fourth frictional engagement elements 22, and the first frictional engagement elements 11 and the second frictional engagement elements 12. Therefore, a configuration is created in which the linear motion mechanism 33 easily moves both the second pressing part 312 and the first pressing part 311.

In the present embodiment, the linear motion mechanism 33 includes a screw shaft 331 rotatably supported with respect to the non-rotary member NR and a nut member 332 that is screwed to the screw shaft 331, as shown in FIG. 12.

Screw threads are formed on the outer peripheral portion of the screw shaft 331. The screw shaft 331 is formed to extend along the axial direction L. In the present embodiment, the screw shaft 331 is disposed coaxially with the brake mechanism 2 and the clutch mechanism 1. In the present embodiment, the screw shaft 331 is disposed at a position that is on the inner side, in the radial direction R, with respect to the second inner support part 931 of the brake mechanism 2 and that overlaps the second inner support part 931 as viewed in a radial direction along the radial direction R.

Grooves that engage with the screw threads of the screw shaft 331 are formed on the inner peripheral portion of the nut member 332. When the screw shaft 331 rotates, the nut member 332 performs a linear motion along the axial direction L in accordance with the rotation direction and the direction of the screw threads of the screw shaft 331.

In the present embodiment, the nut member 332 is coupled to the second pressing part 312 of the brake mechanism 2 so as to move integrally therewith in the axial direction L. In the present embodiment, the fourth bearing B4 is disposed between, in the axial direction L, the second pressing part 312 and the first pressing part 311, as described above. Therefore, when the screw shaft 331 rotates such that the nut member 332 moves to the axial first side L1 in the present embodiment, the second pressing part 312 moves to the axial first side L1 via the nut member 332, and the first pressing part 311 also moves to the axial first side L1 via the fourth bearing B4. As a result, the first frictional engagement elements 11 and the second frictional engagement elements 12 are pressed by the first pressing part 311 to bring the clutch mechanism 1 into an engaged state, and the pressing on the third frictional engagement elements 21 and the fourth frictional engagement elements 22 by the second pressing part 312 is released to bring the brake mechanism 2 into a disengaged state. In this state, power is transmitted between the rotor RT and the input member IM.

On the other hand, when the screw shaft 331 rotates such that the nut member 332 moves to the axial second side L2 in the present embodiment, the second pressing part 312 moves to the axial second side L2 via the nut member 332. As a result, the third frictional engagement elements 21 and the fourth frictional engagement elements 22 are pressed by the second pressing part 312 to bring the brake mechanism 2 into an engaged state, and the pressing on the first frictional engagement elements 11 and the second frictional engagement elements 12 by the first pressing part 311 is released to bring the clutch mechanism 1 into a disengaged state. In this state, power transmission between the rotor RT and the input member IM is blocked.

The transmission mechanism 5 is configured to transmit the power of the driving source 4 to the linear motion mechanism 33. In the present embodiment, the transmission mechanism 5 includes a first gear 51, a second gear 52, a third gear 53, a fourth gear 54, and a coupling body 55, as shown in FIG. 10.

The first gear 51 is coupled to the output shaft of the driving source 4 so as to rotate integrally therewith. In the present embodiment, the first gear 51 is disposed coaxially with the screw shaft 331 of the linear motion mechanism 33. The first gear 51 is disposed on the axial first side L1 with respect to the driving source 4.

The second gear 52 meshes with the first gear 51. In the present embodiment, the second gear 52 is formed to have a larger diameter than the first gear 51. The third gear 53 is coupled to the second gear 52 so as to rotate integrally therewith. In the present embodiment, the third gear 53 is formed to have a smaller diameter than the second gear 52. The third gear 53 is disposed on the axial first side L1 with respect to the second gear 52. In the present embodiment, the second gear 52 and the third gear 53 are rotatably supported with respect to the case 9 by a first shaft body 56. The first shaft body 56 is formed to extend along the axial direction L. In the present embodiment, the first shaft body 56 is disposed to penetrate the sixth side wall portion 96 in the axial direction L. The end portion, on the axial first side L1, of the first shaft body 56 is rotatably supported with respect to the support wall portion 93. The end portion, on the axial second side L2, of the first shaft body 56 is rotatably supported with respect to the cover portion 94.

The fourth gear 54 meshes with the third gear 53. In the present embodiment, the fourth gear 54 is formed to have a larger diameter than the third gear 53. In the present embodiment, the fourth gear 54 is disposed coaxially with the screw shaft 331 of the linear motion mechanism 33. In the present embodiment, the fourth gear 54 is coupled to the coupling body 55 via a second shaft body 57 so as to rotate integrally therewith. The second shaft body 57 is formed to extend along the axial direction L. In the present embodiment, the second shaft body 57 is disposed to penetrate the sixth side wall portion 96 and the support wall portion 93 in the axial direction L.

In the present embodiment, the number of teeth of the second gear 52 is larger than the number of teeth of the first gear 51. The number of teeth of the fourth gear 54 is larger than the number of teeth of the third gear 53 that rotates integrally with the second gear 52. Therefore, in the present embodiment, the rotation transmitted from the driving source 4 to the first gear 51 is decelerated between the first gear 51 and the second gear 52, which is transmitted to the third gear 53. Then, the rotation of the third gear 53 is decelerated between the third gear 53 and the fourth gear 54, which is transmitted to the coupling body 55.

As shown in FIG. 12, the coupling body 55 couples the fourth gear 54 to the screw shaft 331 such that the fourth gear 54 and the screw shaft 331 rotate integrally with each other. In the present embodiment, the coupling body 55 is formed in a tubular shape whose axial second side L2 is opened. The coupling body 55 and the second shaft body 57 are coupled to rotate integrally with each other in a state where the second shaft body 57 is disposed on the inner side, in the radial direction R, with respect to the coupling body 55. In the present embodiment, the coupling body 55 and the screw shaft 331 are coupled to rotate integrally with each other in a state where the screw shaft 331 is disposed to protrude from the coupling body 55 to the axial first side L1. In the present embodiment, the coupling body 55 is disposed at a position that is on the inner side, in the radial direction R, with respect to the second inner support part 931 of the brake mechanism 2 and that overlaps the second inner support part 931 as viewed in a radial direction along the radial direction R.

The driving source 4 is a device that generates power for driving the linear motion mechanism 33. In the present embodiment, the driving source 4 is supported by the cover portion 94. In the shown example, the driving source 4 is coupled to the cover portion 94 from the axial second side L2. In the present example, the driving source 4 is an electric motor.

In the present embodiment, the vehicle driving device 1000 further includes a driving mechanism 7 that changes states of engagement of both the brake mechanism 2 and the clutch mechanism 1, in which the brake mechanism 2 and the clutch mechanism 1 are arranged side by side in the axial direction L, and the driving mechanism 7 is configured to change its state between a first state where the brake mechanism 2 is brought into an engaged state and the clutch mechanism 1 is brought into a disengaged state and a second state where the brake mechanism 2 is brought into a disengaged state and the clutch mechanism 1 is brought into an engaged state, as described above.

According to this configuration, the states of engagement of both the brake mechanism 2 and the clutch mechanism 1 can be changed by the common driving mechanism 7. Therefore, the vehicle driving device 1000 is easily downsized as compared with a configuration in which the respective brake mechanism 2 and clutch mechanism 1 are driven by different driving mechanisms.

In the present embodiment, the reduction device RD is a planetary gear mechanism including a sun gear SG, a carrier CR, and a ring gear RG. Here, the reduction device RD is a planetary gear mechanism of a single pinion type. In the present embodiment, the reduction device RD is disposed at a position not overlapping the rotating electrical machine MG as viewed in a radial direction along the radial direction R. In the shown example, the reduction device RD is disposed on the axial first side L1 from the rotating electrical machine MG.

In the present embodiment, the sun gear SG is coupled to the input member IM so as to rotate integrally therewith, as shown in FIG. 10. That is, in the present embodiment, the sun gear SG is an input element for the reduction device RD. In the shown example, the sun gear SG is formed in a portion that is on the axial first side L1 from the first side wall portion 92 of the case 9 in the input member IM. In the present embodiment, the sun gear SG is disposed on the inner side, in the radial direction R, from the rotor RT. In the shown example, the sun gear SG is disposed on the inner side, in the radial direction R, from the third frictional engagement elements 21 and the fourth frictional engagement elements 22 of the brake mechanism 2, and the first frictional engagement elements 11 and the second frictional engagement elements 12 of the clutch mechanism 1.

The carrier CR rotatably supports a pinion gear PG. The pinion gear PG meshes with the sun gear SG and the ring gear RG. The pinion gear PG rotates around the axis thereof (rotates on its own axis) and rotates (revolves) around the sun gear SG together with the carrier CR. A plurality of the pinion gears PG are provided to be spaced apart from each other along the revolution locus thereof.

In the present embodiment, the carrier CR is coupled to the output member OM so as to rotate integrally therewith. That is, in the present embodiment, the carrier CR is an output element of the reduction device RD. In the present embodiment, the carrier CR includes a first supported part CRa rotatably supported with respect to the case 9 via a thirteenth bearing B13, and a second supported part CRb rotatably supported with respect to the case 9 via a fourteenth bearing B14.

In the present embodiment, the first supported part CRa is formed in a tubular shape whose axis is the same as the sun gear SG. The first supported part CRa is disposed on the axial first side L1 with respect to the pinion gear PG so as to penetrate the fifth side wall portion 95 of the case 9 in the axial direction L. The thirteenth bearing B13 is a radial bearing disposed between, in the radial direction R, the first supported part CRa and the fifth side wall portion 95. In the shown example, the thirteenth bearing B13 is disposed to support the first supported part CRa from the outer side in the radial direction R. The thirteenth bearing B13 is an angular ball bearing in which a virtual line (line of action), passing through the contact point between the rolling element and the bearing ring of the thirteenth bearing B13, tilts with respect to the axial direction L.

In the present embodiment, the second supported part CRb is formed in a tubular shape whose axis is the same as the first supported part CRa. The second supported part CRb is disposed on the axial second side L2 with respect to the pinion gear PG. The fourteenth bearing B14 is a radial bearing disposed between, in the radial direction R, the second supported part CRb and the first side wall portion 92 of the case 9. In the shown example, the fourteenth bearing B14 is disposed to support the second supported part CRb from the inner side in the radial direction R. The fourteenth bearing B14 is an angular ball bearing in which a virtual line (line of action), passing through the contact point between the rolling element and the bearing ring of the fourteenth bearing B14, tilts with respect to the axial direction L. Here, the thirteenth bearing B13 and the fourteenth bearing B14 are disposed such that the directions in which their lines of action tilt with respect to the axial direction L are opposite to each other.

In the present embodiment, the ring gear RG is fixed to the case 9. In the shown example, the ring gear RG is formed integrally with the first side wall portion 92 of the case 9. In the present embodiment, the ring gear RG is disposed to overlap the stator ST as viewed in an axial direction along the axial direction L.

In the present embodiment, the reduction device RD is a planetary gear mechanism including the sun gear SG, the carrier CR, and the ring gear RG, and is disposed at a position not overlapping the rotating electrical machine MG as viewed in a radial direction along the radial direction R,
  the rotor RT is disposed on the inner side, in the radial direction R, with respect to the stator ST of the rotating electrical machine MG,
  the ring gear RG is disposed to overlap the stator ST as viewed in an axial direction along the axial direction L, and
  the sun gear SG is disposed on the inner side, in the radial direction R, from the rotor RT, as described above.

According to this configuration, a large dimensional difference between, in the radial direction R, the ring gear RG and the sun gear SG can be ensured. As a result, a large reduction ratio of the reduction device RD is easily ensured.

In the present embodiment, the reduction device RD includes one planetary gear mechanism. According to this configuration, the dimension, in the axial direction L, of the reduction device RD can be reduced to a smaller one than in a configuration in which, for example, a parallel shaft gear mechanism and the planetary gear mechanism are arranged side by side in the axial direction L.

In the present embodiment, the output member OM is a wheel hub. In the present embodiment, the output member OM includes a coupling part OMa and a joint part OMb.

The coupling part OMa is coupled to the output element of the reduction device RD so as to rotate integrally therewith. In the present embodiment, the coupling part OMa is formed to extend along the axial direction L. The coupling part OMa is coupled to the first supported part CRa of the carrier CR so as to rotate integrally therewith, in a state where the coupling part OMa is disposed on the inner side, in the radial direction R, with respect to the first supported part CRa.

The joint part OMb is configured to be joined to the wheel W. In the present embodiment, the joint part OMb is formed to protrude from a portion on the axial first side L1 from the first supported part CRa of the carrier CR in the coupling part OMa to the outer side in the radial direction R. The joint part OMb is coupled to the wheel W in a state where the joint part OMb is disposed on the axial second side L2 with respect to the wheel W by a plurality of wheel coupling members C2 disposed in a distributed manner in the circumferential direction around the axis of the joint part OMb.

In the present embodiment, the output member OM is a wheel hub including the joint part OMb to be joined to the wheel W, and
  the reduction device RD is disposed between, in the axial direction L, the joint part OMb and the rotating electrical machine MG, as described above.

According to this configuration, the dimension, in the radial direction R, of the vehicle driving device 1000 is easily reduced to a smaller one while a large dimension, in the radial direction R, of the rotating electrical machine MG is ensured, than in a configuration in which the reduction device RD is disposed to overlap the rotating electrical machine MG as viewed in a radial direction along the radial direction R.

As described above, the vehicle driving device 1000 includes:
  a rotating electrical machine MG including a rotor RT;
  an input member IM to which rotation of the rotor RT is transmitted;
  an output member OM that rotates integrally with a wheel W;
  a reduction device RD that decelerates rotation of the input member IM and transmits the rotation to the output member OM; and
  a brake mechanism 2 that selectively engages the input member IM with a non-rotary member NR, in which
  the brake mechanism 2 is disposed at a position that is on the inner side, in the radial direction R, with respect to the rotor RT and that overlaps the rotor RT as viewed in a radial direction along the radial direction R, and
  the rotor RT, the input member IM, and the brake mechanism 2 are disposed coaxially with the output member OM.

According to this configuration, the rotor RT is disposed on the outer side, in the radial direction R, with respect to the brake mechanism 2. As a result, the rotating electrical machine MG is larger than the brake mechanism 2 in the radial direction R, and thus an increase in the output torque by the increased diameter of the rotating electrical machine MG is easily achieved. According to this configuration, the brake mechanism 2 is disposed at a position overlapping the rotor RT as viewed in a radial direction along the radial direction R. As a result, the dimension, in the axial direction L, of the vehicle driving device 1000 can be reduced to a smaller one than in a configuration in which the brake mechanism 2 is disposed on one side, in the axial direction L, from the rotor RT. Therefore, according to the present configuration, the dimension in the axial direction L can be reduced to a small one while large output torque of the rotating electrical machine MG is ensured.

According to the present configuration, the rotor RT, the input member IM, and the brake mechanism 2 are disposed coaxially with the output member OM that rotates integrally with the wheel W. As a result, a configuration suitable for a driving device for the wheel W, such as an in-wheel motor, can be realized.

6. Other Embodiments (1) In the engagement device 100 according to the above embodiments, a configuration, in which the linear motion mechanism 33 is disposed on the axial second side L2 with respect to the second coupling part 8b, has been described as an example. Without being limited to such a configuration, however, the linear motion mechanism 33 may be disposed, for example, to overlap the second coupling part 8b as viewed in a radial direction along the radial direction R.

(2) In the engagement device 100 according to the above embodiments, a configuration, in which the linear motion mechanism 33 is disposed at a position that is on the inner side, in the radial direction R, with respect to the fourth coupling part 8d of the non-rotary member NR and that overlaps the fourth coupling part 8d as viewed in a radial direction along the radial direction R, has been described as an example. Without being limited to such a configuration, however, the linear motion mechanism 33 may be disposed to be shifted to the axial first side L1 or the axial second side L2 with respect to the fourth coupling part 8d.

(3) In the engagement device 100 according to the above embodiments, a configuration, in which the driven part 32 is coupled to the second pressing part 312 supported in a state where relative rotation with respect to the non-rotary member NR is restricted, so as to move integrally therewith in the axial direction L, has been described as an example. Without being limited to such a configuration, however, the driven part 32 may be coupled to the first pressing part 311 supported in a state where the first pressing part 311 rotates integrally with the first rotary member 81 or the second rotary member 82, so as to move integrally therewith in the axial direction L.

(4) In the engagement device 100 according to the above embodiments, a configuration, in which the linear motion mechanism 33 includes the screw shaft 331 and the nut member 332, has been described as an example. Without being limited to such a configuration, however, the linear motion mechanism 33 may include, for example, a rail and a slide member that slides along the rail.

(5) In the engagement device 100 according to the above embodiments, a configuration, in which the screw shaft 331 is disposed coaxially with the first frictional engagement elements 11, the second frictional engagement elements 12, the third frictional engagement elements 21, and the fourth frictional engagement elements 22 and is disposed on the inner side, in the radial direction R, with respect thereto, has been described as an example. Without being limited to such a configuration, however, the screw shaft 331 may be disposed on an axis different from the first frictional engagement elements 11, the second frictional engagement elements 12, the third frictional engagement elements 21, and the fourth frictional engagement elements 22. In addition, the screw shaft 331 may be disposed on the outer side, in the radial direction R, with respect to the first frictional engagement elements 11, the second frictional engagement elements 12, the third frictional engagement elements 21, and the fourth frictional engagement elements 22.

(6) In the engagement device 100 according to the above embodiments, a configuration, in which the driving source 4 is disposed on an axis different from the screw shaft 331 and the arrangement region, in the axial direction L, for the driving source 4 overlaps the arrangement region, in the axial direction L, for the first rotary member 81, has been described as an example. Without being limited to such a configuration, however, the driving source 4 may be disposed coaxially with the screw shaft 331. In addition, the driving source 4 may be disposed to be shifted to the axial first side L1 or the axial second side L2 with respect to the first rotary member 81.

(7) In the engagement device 100 according to the above embodiments, a configuration, in which the transmission mechanism 5 decelerates the rotation of the driving source 4 and transmits the rotation to the screw shaft 331, has been described as an example. Without being limited to such a configuration, however, a configuration, in which, for example, the transmission mechanism 5 transmits the rotation of the driving source 4 as it is to the screw shaft 331, may be adopted.

(8) In the vehicle driving device 1000 according to the first and second embodiments, a configuration, in which the planetary gear mechanism PL is a planetary gear mechanism of a single pinion type, has been described as an example. Without being limited to such a configuration, however, the planetary gear mechanism PL may be a planetary gear mechanism of a double pinion type. In this case, a configuration, in which, for example, the first rotary element E1 is the first sun gear S1, the second rotary element E2 is the first ring gear R1, and the third rotary element E3 is the first carrier C1, can be adopted.

(9) In the vehicle driving device 1000 according to the first and second embodiments, a configuration, including the differential gear mechanism DF that distributes the rotation of the output gear OG to a pair of the output members OM, has been described as an example. Without being limited to such a configuration, however, a configuration, in which the differential gear mechanism DF is not included and the rotation of the output gear OG is transmitted to one output member OM, may be adopted.

(10) In the vehicle driving device 1000 according to the first and second embodiments, a configuration, in which the output gear OG is disposed coaxially with the output member OM, has been described as an example. Without being limited to such a configuration, however, the output gear OG may be disposed on an axis different from the output member OM.

(11) In the vehicle driving device 1000 according to the first and second embodiments, a configuration, in which the differential gear mechanism DF is a differential gear mechanism of a planetary gear type, has been described as an example. However, without being limited to such a configuration, for example, a differential gear mechanism of a bevel gear type, including a pair of side gears each coupled to the different output members OM so as to rotate integrally therewith and a plurality of pinion gears that mesh with the pair of side gears, may be adopted.

(12) In the vehicle driving device 1000 according to the first and second embodiments, a configuration, in which the planetary gear mechanism PL is disposed on the rotor RT side in the axial direction L (the axial first side L1) with respect to the engagement device 100, has been described as an example. Without being limited to such a configuration, however, the planetary gear mechanism PL may be disposed on the side (the axial second side L2) opposite to the rotor RT side in the axial direction L with respect to the engagement device 100.

(13) In the vehicle driving device 1000 according to the third embodiment, a configuration, in which the vehicle driving device 1000 is configured as an in-wheel motor and the output member OM includes the joint part OMb to be joined to the wheel W, has been described as an example. But, the vehicle driving device 1000 is not limited to such a configuration. A configuration, in which, for example, the output member OM is a drive shaft coupled to the wheel W so as to rotate integrally therewith, may be adopted.

(14) In the vehicle driving device 1000 according to the third embodiment, a configuration, including the clutch mechanism 1 that selectively engages the rotor RT with the input member IM, has been described as an example. Without being limited to such a configuration, however, a configuration not including the clutch mechanism 1 may be adopted.

(15) In the vehicle driving device 1000 according to the third embodiment, a configuration, including the driving mechanism 7 that changes the states of engagement of both the brake mechanism 2 and the clutch mechanism 1, has been described as an example. Without being limited to such a configuration, however, a configuration, in which, for example, a driving mechanism that changes the state of engagement of the brake mechanism 2 and a driving mechanism that changes the state of engagement of the clutch mechanism 1 are provided independently, may be adopted.

(16) In the vehicle driving device 1000 according to the third embodiment, a configuration, in which the reduction device RD is disposed at a position not overlapping the rotating electrical machine MG as viewed in a radial direction along the radial direction R, has been described as an example. Without being limited to such a configuration, however, the reduction device RD may be disposed to overlap the rotating electrical machine MG as viewed in a radial direction along the radial direction R.

(17) In the vehicle driving device 1000 according to the third embodiment, a configuration, in which the reduction device RD is a planetary gear mechanism of a single pinion type, has been described as an example. Without being limited to such a configuration, however, the reduction device RD may be, for example, a planetary gear mechanism of a double pinion type. In this case, a configuration, in which, for example, the sun gear SG is coupled to the input member IM so as to rotate integrally therewith, the ring gear RG is coupled to the output member OM so as to rotate integrally therewith, and the carrier CR is fixed to the non-rotary member NR, may be adopted.

(18) In the vehicle driving device 1000 according to the third embodiment, a mode, in which the reduction device RD includes one planetary gear mechanism, has been described as an example. Without being limited to such a configuration, however, the reduction device RD may include, for example, a parallel shaft gear mechanism including gears each disposed on different axes to mesh with each other.

(19) Note that the configurations disclosed in each of the above-described embodiments can be applied in combination with the configurations disclosed in another embodiment as long as there is no contradiction. Regarding other configurations, the embodiments disclosed in the present description are merely examples in all respects. Therefore, various modifications can be appropriately made without departing from the gist of the present disclosure.

Outline of Above Embodiments

Hereinafter, an outline of the engagement device (100) described above will be described.

An engagement device (100) includes:

a clutch mechanism (1) that selectively engages a first rotary member (81) with a second rotary member (82); and a brake mechanism (2) that selectively engages a target rotary member (8T) that is one of the first rotary member (81) and the second rotary member (82) with a non-rotary member (NR), the engagement device (100) including a pressing mechanism (3) that changes states of engagement of the clutch mechanism (1) and the brake mechanism (2), in which:

when a direction along an axis of rotation of the first rotary member (81) is defined as an axial direction (L), one side in the axial direction (L) is defined as an axial first side (L1), and the other side in the axial direction (L) is defined as an axial second side (L2);

the clutch mechanism (1) includes a first frictional engagement element (11) coupled to the first rotary member (81) so as to rotate integrally with the first rotary member (81), and a second frictional engagement element (12) coupled to the second rotary member (82) so as to rotate integrally with the second rotary member (82);

the first frictional engagement element (11) and the second frictional engagement element (12) are disposed to face each other in the axial direction (L), and are frictionally engaged with each other by being pressed in the axial direction (L);

the brake mechanism (2) includes a third frictional engagement element (21) coupled to the target rotary member (8T) so as to rotate integrally with the target rotary member (8T), and a fourth frictional engagement element (22) fixed to the non-rotary member (NR);

the third frictional engagement element (21) and the fourth frictional engagement element (22) are disposed to face each other in the axial direction (L) at positions spaced apart, to the axial second side (L2), from the first frictional engagement element (11) and the second frictional engagement element (12), and are frictionally engaged with each other by being pressed in the axial direction (L);

the pressing mechanism (3) includes a pressing part (31) disposed between, in the axial direction (L), the first frictional engagement element (11) and the second frictional engagement element (12), and the third frictional engagement element (21) and the fourth frictional engagement element (22), a driven part (32) coupled to the pressing part (31) so as to interlock with the pressing part (31), and a linear motion mechanism (33) that moves the driven part (32) in the axial direction (L);

the first rotary member (81), the second rotary member (82), the first frictional engagement element (11), the second frictional engagement element (12), the third frictional engagement element (21), and the fourth frictional engagement element (22) are coaxially disposed; and the clutch mechanism (1) and the brake mechanism (2) are selectively engaged in accordance with whether the driven part (32) is moved to the axial first side (L1) or to the axial second side (L2) by the linear motion mechanism (33).

According to this configuration, the pressing part (31), that is moved in the axial direction (L) via the driven part (32) by the linear motion mechanism (33), is disposed between, in the axial direction (L), the first frictional engagement element (11) and the second frictional engagement element (12), and the third frictional engagement element (21) and the fourth frictional engagement element (22) that are disposed on the axial second side (L2) with respect to the first frictional engagement element (11) and the second frictional engagement element (12). Then, when the driven part (32) is moved to the axial first side (L1) by the linear motion mechanism (33), the first frictional engagement element (11) and the second frictional engagement element (12) are pressed by the pressing part (31) to bring the clutch mechanism (1) into an engaged state, and the pressing on the third frictional engagement element (21) and the fourth frictional engagement element (22) by the pressing part (31) is released to bring the brake mechanism (2) into a disengaged state. On the other hand, when the driven part (32) is moved to the axial second side (L2) by the linear motion mechanism (33), the third frictional engagement element (21) and the fourth frictional engagement element (22) are pressed by the pressing part (31) to bring the brake mechanism (2) into an engaged state, and the pressing on the first frictional engagement element (11) and the second frictional engagement element (12) by the pressing part (31) is released to bring the clutch mechanism (1) into a disengaged state. As a result, the states of engagement of the clutch mechanism (1) and the brake mechanism (2) can be changed by the common pressing mechanism (3). Therefore, in a configuration including the clutch mechanism 1 and the brake mechanism 2, the engagement device (100) can be downsized.

Here, it is preferable that the first rotary member (81) include a first coupling part (8a) to which the first frictional engagement element (11) has been coupled, the second rotary member (82) include a second coupling part (8b) to which the second frictional engagement element (12) has been coupled, the target rotary member (8T) include a third coupling part (8c) to which the third frictional engagement element (21) has been coupled, the non-rotary member (NR) include a fourth coupling part (8d) to which the fourth frictional engagement element (22) has been coupled, the first coupling part (8a) be disposed at a position that is on an outer side, in a radial direction (R), with respect to the first frictional engagement element (11) and that overlaps the first frictional engagement element (11) as viewed in a radial direction along the radial direction (R), the third coupling part (8c) be disposed at a position that is on an outer side, in the radial direction (R), with respect to the third frictional engagement element (21) and that overlaps the third frictional engagement element (21) as viewed in the radial direction, the second coupling part (8b) be disposed at a position that is on an inner side, in the radial direction (R), with respect to the second frictional engagement element (12) and that overlaps the second frictional engagement element (12) and the first coupling part (8a) as viewed in the radial direction, the fourth coupling part (8d) be disposed at a position that is on an inner side, in the radial direction (R), with respect to the fourth frictional engagement element (22) and that overlaps the fourth frictional engagement element (22) and the third coupling part (8c) as viewed in the radial direction, and the linear motion mechanism (33) be disposed on the axial second side (L2) with respect to the second coupling part (8b), and be disposed at a position that is on an inner side, in the radial direction (R), with respect to the fourth coupling part (8d) and that overlaps the fourth coupling part (8d) as viewed in the radial direction.

According to this configuration, the linear motion mechanism (33) is disposed on the axial second side (L2) with respect to the second coupling part (8b) of the second rotary member (82). As a result, the dimension, in the radial direction R, of the engagement device (100) can be reduced to a smaller one than in a configuration in which the linear motion mechanism (33) is disposed to overlap the second coupling part (8b) as viewed in the radial direction.

According to the present configuration, the linear motion mechanism (33) is disposed at a position that is on the inner side, in the radial direction (R), with respect to the fourth coupling part (8d) of the non-rotary member (NR) and that overlaps the fourth coupling part (8d) as viewed in a radial direction along the radial direction (R). As a result, the dimension, in the axial direction (L), of the engagement device (100) can be reduced to a smaller one than in a configuration in which the linear motion mechanism (33) is disposed to be shifted in the axial direction (L) from the fourth coupling part (8d). In addition, the linear motion mechanism (33) disposed on the inner side, in the radial direction (R), with respect to the fourth coupling part (8d) of the non-rotary member (NR) is easily supported by the non-rotary member (NR), so that the support structure for the linear motion mechanism (33) is easily simplified.

In addition, it is preferable that the pressing part (31) include a first pressing part (311) that presses the first frictional engagement element (11) and the second frictional engagement element (12) in the axial direction (L), and a second pressing part (312) that presses the third frictional engagement element (21) and the fourth frictional engagement element (22) in the axial direction (L), the first pressing part (311) be supported in a state where the first pressing part (311) is relatively movable in the axial direction (L) with respect to the first rotary member (81) or the second rotary member (82) and rotates integrally therewith, the second pressing part (312) be supported in a state where the second pressing part (312) is relatively movable in the axial direction (L) with respect to the non-rotary member (NR) and relative rotation is restricted, the first pressing part (311) and the second pressing part (312) be configured to interlock with each other in the axial direction (L) in a relatively rotatable state, and the driven part (32) be coupled to the second pressing part (312) so as to move integrally with the second pressing part (312) in the axial direction (L).

According to this configuration, the driven part (32), that is moved in the axial direction (L) by the linear motion mechanism (33), is coupled to the second pressing part (312), supported in a state where relative rotation with respect to the non-rotary member (NR) is restricted, so as to move integrally with the second pressing part (312) in the axial direction (L). As a result, the pressing mechanism (3) is easily simplified as compared with a configuration in which the driven part (32) is coupled to the first pressing part (311), that is supported in a state where the first pressing part (311) rotates integrally with the first rotary member (81) or the second rotary member (82), so as to move integrally therewith in the axial direction (L).

In addition, it is preferable that
the linear motion mechanism (33) include a screw shaft (331) rotatably supported with respect to the non-rotary member (NR), and a nut member (332) that is screwed to the screw shaft (331),
the nut member (332) be coupled to the driven part (32) so as to move integrally with the driven part (32) in the axial direction (L), and
the screw shaft (331) be disposed coaxially with the first frictional engagement element (11), the second frictional engagement element (12), the third frictional engagement element (21), and the fourth frictional engagement element (22) and be disposed on the inner side, in the radial direction (R), with respect thereto.

According to this configuration, the screw shaft (331) for moving the nut member (332) in the axial direction (L) is disposed on the inner side, in the radial direction (R), with respect to the first frictional engagement element (11), the second frictional engagement element (12), the third frictional engagement element (21), and the fourth frictional engagement element (22). As a result, a driving force for rotationally driving the screw shaft (331) is easily transmitted to the screw shaft (331) from the outside, in the axial direction (L), with respect to the frictional engagement elements (11, 12, 21, 22). Therefore, a structure is easily realized, in which the pressing part (31), disposed between, in the axial direction (L), the first frictional engagement element (11) and the second frictional engagement element (12), and the third frictional engagement element (21) and the fourth frictional engagement element (22), is movable in the axial direction (L) via the nut member (332) and the driven part (32).

In addition, according to the present configuration, the screw shaft (331) of the linear motion mechanism (33) is easily disposed to overlap at least a part of the first frictional engagement element (11), the second frictional engagement element (12), the third frictional engagement element (21), and the fourth frictional engagement element (22) as viewed in a radial direction along the radial direction (R). As a result, an increase in the size, in the axial direction (L), of the engagement device (100) due to arrangement of the linear motion mechanism (33) can be suppressed.

In the configuration in which the linear motion mechanism (33) includes the screw shaft (331) and the nut member (332), it is preferable that
the engagement device (100) further include a driving source (4) for rotationally driving the screw shaft (331), and a transmission mechanism (5) that transmits power between the driving source (4) and the screw shaft (331),
the driving source (4) be disposed on an axis different from the screw shaft (331),
an arrangement region, in the axial direction (L), for the driving source (4) overlap an arrangement region, in the axial direction (L), for the first rotary member (81),
the transmission mechanism (5) be disposed on the axial second side (L2) with respect to the linear motion mechanism (33),
a first shaft member (10), disposed to extend from the first rotary member (81) to the axial first side (L1), be coupled to the first rotary member (81) so as to rotate integrally with the first rotary member (81), and
a second shaft member (20), disposed to extend from the second rotary member (82) to the axial first side (L1), be coupled to the second rotary member (82) so as to rotate integrally with the second rotary member (82).

According to this configuration, the dimension, in the axial direction (L), of the engagement device (100) can be reduced to a smaller one than in a configuration in which the driving source (4) is disposed at a position that is on the same axis as and is shifted in the axial direction (L) from the first rotary member (81).

INDUSTRIAL APPLICABILITY

The technology according to the present disclosure can be used for an engagement device including a clutch mechanism and a brake mechanism.

REFERENCE SIGNS LIST

100: Engagement device, 1: Clutch mechanism, 11: First frictional engagement element, 12: Second frictional engagement element, 2: Brake mechanism, 21: Third frictional engagement element, 22: Fourth frictional engagement element, 3: Pressing mechanism, 31: Pressing part, 32: Driven part, 33: Linear motion mechanism, 81: First rotary member, 82: Second rotary member, 8T: Target rotary member, 10: First shaft member, 20: Second shaft member, NR: Non-rotary member, L: Axial direction, L1: Axial first side, and L2: Axial second side

The invention claimed is:

1. An engagement device including a clutch mechanism that selectively engages a first rotary member with a second rotary member, and a brake mechanism that selectively engages a target rotary member that is one of the first rotary member and the second rotary member with a non-rotary member,
the engagement device comprising a pressing mechanism that changes states of engagement of the clutch mechanism and the brake mechanism, wherein:
when a direction along an axis of rotation of the first rotary member is defined as an axial direction, one side in the axial direction is defined as an axial first side, and the other side in the axial direction is defined as an axial second side;
the clutch mechanism includes a first frictional engagement element coupled to the first rotary member so as to rotate integrally with the first rotary member, and a second frictional engagement element coupled to the second rotary member so as to rotate integrally with the second rotary member;
the first frictional engagement element and the second frictional engagement element are disposed to face each other in the axial direction, and are frictionally engaged with each other by being pressed in the axial direction;

the brake mechanism includes a third frictional engagement element coupled to the target rotary member so as to rotate integrally with the target rotary member, and a fourth frictional engagement element fixed to the non-rotary member;

the third frictional engagement element and the fourth frictional engagement element are disposed to face each other in the axial direction at positions spaced apart, to the axial second side, from the first frictional engagement element and the second frictional engagement element, and are frictionally engaged with each other by being pressed in the axial direction;

the pressing mechanism includes a pressing part disposed between, in the axial direction, the first frictional engagement element and the second frictional engagement element, and the third frictional engagement element and the fourth frictional engagement element, a driven part coupled to the pressing part so as to interlock with the pressing part, and a linear motion mechanism that moves the driven part in the axial direction;

the first rotary member, the second rotary member, the first frictional engagement element, the second frictional engagement element, the third frictional engagement element, and the fourth frictional engagement element are coaxially disposed;

the clutch mechanism and the brake mechanism are selectively engaged in accordance with whether the driven part is moved to the axial first side or to the axial second side by the linear motion mechanism;

the first rotary member includes a first coupling part to which the first frictional engagement element has been coupled, the second rotary member includes a second coupling part to which the second frictional engagement element has been coupled, the target rotary member includes a third coupling part to which the third frictional engagement element has been coupled, the non-rotary member includes a fourth coupling part to which the fourth frictional engagement element has been coupled, the first coupling part is disposed at a position that is on an outer side, in a radial direction, with respect to the first frictional engagement element and that overlaps the first frictional engagement element as viewed in a radial direction along the radial direction, the third coupling part is disposed at a position that is on an outer side, in the radial direction, with respect to the third frictional engagement element and that overlaps the third frictional engagement element as viewed in the radial direction, the second coupling part is disposed at a position that is on an inner side, in the radial direction, with respect to the second frictional engagement element and that overlaps the second frictional engagement element and the first coupling part as viewed in the radial direction, the fourth coupling part is disposed at a position that is on an inner side, in the radial direction, with respect to the fourth frictional engagement element and that overlaps the fourth frictional engagement element and the third coupling part as viewed in the radial direction, and the linear motion mechanism is disposed on the axial second side with respect to the second coupling part, and is disposed at a position that is on an inner side, in the radial direction, with respect to the fourth coupling part and that overlaps the fourth coupling part as viewed in the radial direction.

2. The engagement device according to claim 1, wherein the pressing part includes a first pressing part that presses the first frictional engagement element and the second frictional engagement element in the axial direction, and a second pressing part that presses the third frictional engagement element and the fourth frictional engagement element in the axial direction, the first pressing part is supported in a state where the first pressing part is relatively movable in the axial direction with respect to the first rotary member or the second rotary member and rotates integrally with the first rotary member or the second rotary member, the second pressing part is supported in a state where the second pressing part is relatively movable in the axial direction with respect to the non-rotary member and relative rotation is restricted, the first pressing part and the second pressing part are configured to interlock with each other in the axial direction in a relatively rotatable state, and the driven part is coupled to the second pressing part so as to move integrally with the second pressing part in the axial direction.

3. The engagement device according to claim 2, wherein the linear motion mechanism includes a screw shaft rotatably supported with respect to the non-rotary member, and a nut member that is screwed to the screw shaft, the nut member is coupled to the driven part so as to move integrally with the driven part in the axial direction, and the screw shaft is disposed coaxially with the first frictional engagement element, the second frictional engagement element, the third frictional engagement element, and the fourth frictional engagement element and is disposed on an inner side, in the radial direction, with respect thereto.

4. The engagement device according to claim 3, further comprising a driving source for rotationally driving the screw shaft, and a transmission mechanism that transmits power between the driving source and the screw shaft, wherein the driving source is disposed on an axis different from the screw shaft, an arrangement region, in the axial direction, for the driving source overlaps an arrangement region, in the axial direction, for the first rotary member, the transmission mechanism is disposed on the axial second side with respect to the linear motion mechanism, a first shaft member, disposed to extend from the first rotary member to the axial first side, is coupled to the first rotary member so as to rotate integrally with the first rotary member, and a second shaft member, disposed to extend from the second rotary member to the axial first side, is coupled to the second rotary member so as to rotate integrally with the second rotary member.

5. The engagement device according to claim 1, wherein the linear motion mechanism includes a screw shaft rotatably supported with respect to the non-rotary member, and a nut member that is screwed to the screw shaft, the nut member is coupled to the driven part so as to move integrally with the driven part in the axial direction, and the screw shaft is disposed coaxially with the first frictional engagement element, the second frictional engagement element, the third frictional engagement element, and the fourth frictional engagement element and is disposed on an inner side, in the radial direction, with respect thereto.

6. An engagement device including a clutch mechanism that selectively engages a first rotary member with a second rotary member, and a brake mechanism that selectively engages a target rotary member that is one of the first rotary member and the second rotary member with a non-rotary member, the engagement device comprising a pressing mechanism that changes states of engagement of the clutch mechanism and the brake mechanism, wherein:

when a direction along an axis of rotation of the first rotary member is defined as an axial direction, one side in the axial direction is defined as an axial first side, and the other side in the axial direction is defined as an axial second side;

the clutch mechanism includes a first frictional engagement element coupled to the first rotary member so as to rotate integrally with the first rotary member, and a second frictional engagement element coupled to the second rotary member so as to rotate integrally with the second rotary member;

the first frictional engagement element and the second frictional engagement element are disposed to face each other in the axial direction, and are frictionally engaged with each other by being pressed in the axial direction;

the brake mechanism includes a third frictional engagement element coupled to the target rotary member so as to rotate integrally with the target rotary member, and a fourth frictional engagement element fixed to the non-rotary member;

the third frictional engagement element and the fourth frictional engagement element are disposed to face each other in the axial direction at positions spaced apart, to the axial second side, from the first frictional engagement element and the second frictional engagement element, and are frictionally engaged with each other by being pressed in the axial direction;

the pressing mechanism includes a pressing part disposed between, in the axial direction, the first frictional engagement element and the second frictional engagement element, and the third frictional engagement element and the fourth frictional engagement element, a driven part coupled to the pressing part so as to interlock with the pressing part, and a linear motion mechanism that moves the driven part in the axial direction;

the first rotary member, the second rotary member, the first frictional engagement element, the second frictional engagement element, the third frictional engagement element, and the fourth frictional engagement element are coaxially disposed;

the clutch mechanism and the brake mechanism are selectively engaged in accordance with whether the driven part is moved to the axial first side or to the axial second side by the linear motion mechanism;

the pressing part includes a first pressing part that presses the first frictional engagement element and the second frictional engagement element in the axial direction, and a second pressing part that presses the third frictional engagement element and the fourth frictional engagement element in the axial direction;

the first pressing part is supported in a state where the first pressing part is relatively movable in the axial direction with respect to the first rotary member or the second rotary member and rotates integrally with the first rotary member or the second rotary member, the second pressing part is supported in a state where the second pressing part is relatively movable in the axial direction with respect to the non-rotary member and relative rotation is restricted, the first pressing part and the second pressing part are configured to interlock with each other in the axial direction in a relatively rotatable state, and the driven part is coupled to the second pressing part so as to move integrally with the second pressing part in the axial direction.

7. The engagement device according to claim 6, wherein the linear motion mechanism includes a screw shaft rotatably supported with respect to the non-rotary member, and a nut member that is screwed to the screw shaft, the nut member is coupled to the driven part so as to move integrally with the driven part in the axial direction, and the screw shaft is disposed coaxially with the first frictional engagement element, the second frictional engagement element, the third frictional engagement element, and the fourth frictional engagement element and is disposed on an inner side, in the radial direction, with respect thereto.

8. The engagement device according to claim 7, further comprising a driving source for rotationally driving the screw shaft, and a transmission mechanism that transmits power between the driving source and the screw shaft, wherein the driving source is disposed on an axis different from the screw shaft, an arrangement region, in the axial direction, for the driving source overlaps an arrangement region, in the axial direction, for the first rotary member, the transmission mechanism is disposed on the axial second side with respect to the linear motion mechanism, a first shaft member, disposed to extend from the first rotary member to the axial first side, is coupled to the first rotary member so as to rotate integrally with the first rotary member, and a second shaft member, disposed to extend from the second rotary member to the axial first side, is coupled to the second rotary member so as to rotate integrally with the second rotary member.

9. The engagement device according to claim 8, further comprising a driving source for rotationally driving the screw shaft, and a transmission mechanism that transmits power between the driving source and the screw shaft, wherein the driving source is disposed on an axis different from the screw shaft, an arrangement region, in the axial direction, for the driving source overlaps an arrangement region, in the axial direction, for the first rotary member, the transmission mechanism is disposed on the axial second side with respect to the linear motion mechanism, a first shaft member, disposed to extend from the first rotary member to the axial first side, is coupled to the first rotary member so as to rotate integrally with the first rotary member, and a second shaft member, disposed to extend from the second rotary member to the axial first side, is coupled to the second rotary member so as to rotate integrally with the second rotary member.

10. An engagement device including a clutch mechanism that selectively engages a first rotary member with a second rotary member, and a brake mechanism that selectively engages a target rotary member that is one of the first rotary member and the second rotary member with a non-rotary member, the engagement device comprising:

a pressing mechanism that changes states of engagement of the clutch mechanism and the brake mechanism, wherein:
when a direction along an axis of rotation of the first rotary member is defined as an axial direction, one side in the axial direction is defined as an axial first side, and the other side in the axial direction is defined as an axial second side;
the clutch mechanism includes a first frictional engagement element coupled to the first rotary member so as to rotate integrally with the first rotary member, and a second frictional engagement element coupled to the second rotary member so as to rotate integrally with the second rotary member;
the first frictional engagement element and the second frictional engagement element are disposed to face each other in the axial direction, and are frictionally engaged with each other by being pressed in the axial direction;
the brake mechanism includes a third frictional engagement element coupled to the target rotary member so as to rotate integrally with the target rotary member, and a fourth frictional engagement element fixed to the non-rotary member;
the third frictional engagement element and the fourth frictional engagement element are disposed to face each other in the axial direction at positions spaced apart, to the axial second side, from the first frictional engagement element and the second frictional engagement element, and are frictionally engaged with each other by being pressed in the axial direction;
the pressing mechanism includes a pressing part disposed between, in the axial direction, the first frictional engagement element and the second frictional engagement element, and the third frictional engagement element and the fourth frictional engagement element, a driven part coupled to the pressing part so as to interlock with the pressing part, and a linear motion mechanism that moves the driven part in the axial direction;
the first rotary member, the second rotary member, the first frictional engagement element, the second frictional engagement element, the third frictional engagement element, and the fourth frictional engagement element are coaxially disposed;
the clutch mechanism and the brake mechanism are selectively engaged in accordance with whether the driven part is moved to the axial first side or to the axial second side by the linear motion mechanism;
the linear motion mechanism includes a screw shaft rotatably supported with respect to the non-rotary member, and a nut member that is screwed to the screw shaft;
the nut member is coupled to the driven part so as to move integrally with the driven part in the axial direction; and
the screw shaft is disposed coaxially with the first frictional engagement element, the second frictional engagement element, the third frictional engagement element, and the fourth frictional engagement element and is disposed on an inner side, in the radial direction, with respect thereto; and
a driving source for rotationally driving the screw shaft, and a transmission mechanism that transmits power between the driving source and the screw shaft, wherein
the driving source is disposed on an axis different from the screw shaft,
an arrangement region, in the axial direction, for the driving source overlaps an arrangement region, in the axial direction, for the first rotary member,
the transmission mechanism is disposed on the axial second side with respect to the linear motion mechanism,
a first shaft member, disposed to extend from the first rotary member to the axial first side, is coupled to the first rotary member so as to rotate integrally with the first rotary member, and
a second shaft member, disposed to extend from the second rotary member to the axial first side, is coupled to the second rotary member so as to rotate integrally with the second rotary member.

* * * * *